United States Patent
Kim et al.

(10) Patent No.: US 11,012,833 B2
(45) Date of Patent: May 18, 2021

(54) METHOD FOR TRANSMITTING V2X MESSAGE IN WIRELESS COMMUNICATION SYSTEM, AND APPARATUS THEREOF

(71) Applicant: LG ELECTRONICS INC., Seoul (KR)

(72) Inventors: Myoungseob Kim, Seoul (KR); Byounghoon Kim, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 500 days.

(21) Appl. No.: 15/999,825

(22) PCT Filed: Feb. 20, 2017

(86) PCT No.: PCT/KR2017/001828
§ 371 (c)(1),
(2) Date: Aug. 20, 2018

(87) PCT Pub. No.: WO2017/142377
PCT Pub. Date: Aug. 24, 2017

(65) Prior Publication Data
US 2021/0021974 A1 Jan. 21, 2021

Related U.S. Application Data

(60) Provisional application No. 62/297,808, filed on Feb. 20, 2016.

(51) Int. Cl.
*H04W 4/40* (2018.01)
*H04W 76/11* (2018.01)
(Continued)

(52) U.S. Cl.
CPC ............. *H04W 4/40* (2018.02); *H04W 4/021* (2013.01); *H04W 4/027* (2013.01); *H04W 4/12* (2013.01);
(Continued)

(58) Field of Classification Search
CPC ....... H04W 4/021; H04W 4/027; H04W 4/12; H04W 4/40–48; H04W 76/11; H04W 84/042; H04W 92/18; H04W 28/06
See application file for complete search history.

(56) References Cited

U.S. PATENT DOCUMENTS

2013/0279491 A1  10/2013  Rubin et al.
2016/0285935 A1*  9/2016  Wu .................... G08G 1/161
(Continued)

FOREIGN PATENT DOCUMENTS

KR   10-2015-0072809 A1   6/2015
KR        10-1592788 B1    2/2016

OTHER PUBLICATIONS

Bhanja et al. "Vehicular Communication C2X: Wireshark Plugin and Visualization", in: ResearchGate, Oct. 11, 2015, total 8 pages.
(Continued)

*Primary Examiner* — Joshua Kading
(74) *Attorney, Agent, or Firm* — Birch, Stewart, Kolasch & Birch LLP

(57) ABSTRACT

Disclosed is a method for transmitting a V2X message in a wireless communication system, and an apparatus therefor. Specifically, a method by which a first user equipment (UE) transmits a V2X message in a wireless communication system that supports V2X communication comprises the steps of: receiving, from a plurality of second UEs, a plurality of V2X messages; generating a specific V2X message based on the plurality of received V2X messages; and transmitting, to at least one third UE, the generated
(Continued)

specific V2X message, wherein each of the plurality of received V2X messages can include a common information element related to the plurality of second UEs, and a dedicated information element configured for each terminal; and the specific V2X message can include a plurality of dedicated information elements that have been received from the plurality of second UEs and that correspond to the plurality of second UEs, and the common information element.

12 Claims, 29 Drawing Sheets

(51) Int. Cl.
  *H04W 28/06* (2009.01)
  *H04W 84/04* (2009.01)
  *H04W 4/021* (2018.01)
  *H04W 4/02* (2018.01)
  *H04W 4/44* (2018.01)
  *H04W 4/46* (2018.01)
  *H04W 4/12* (2009.01)
  *H04W 92/18* (2009.01)

(52) U.S. Cl.
  CPC ............... *H04W 4/44* (2018.02); *H04W 4/46* (2018.02); *H04W 28/06* (2013.01); *H04W 76/11* (2018.02); *H04W 84/042* (2013.01); *H04W 92/18* (2013.01)

(56) References Cited

U.S. PATENT DOCUMENTS

2018/0077668 A1* 3/2018 Chun ..................... H04W 76/23
2018/0213499 A1* 7/2018 Lee ......................... H04W 4/40

OTHER PUBLICATIONS

Santa et al., "Vehicle-to-Infrastructure Messaging Proposal Based on CAM/DENM Specifications", in: IEEE, Wireless Days (WD), 2013 IFIP, Jan. 6, 2014, total 9 pages.

* cited by examiner

FIG. 10
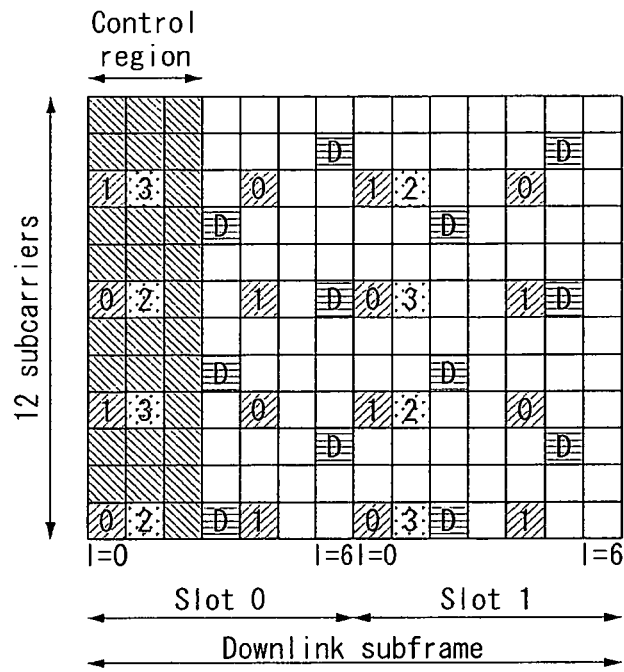
(a)
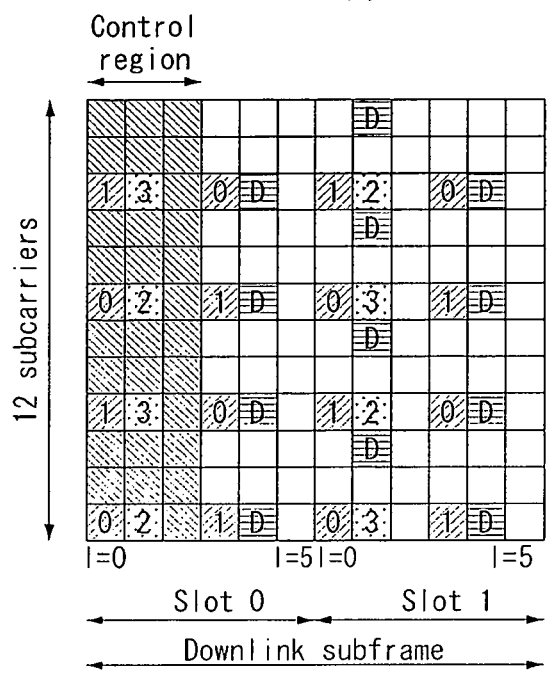
(b)

FIG. 17
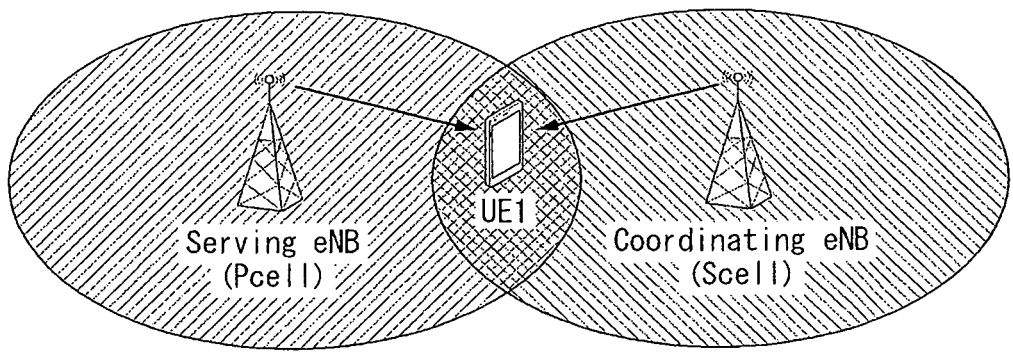
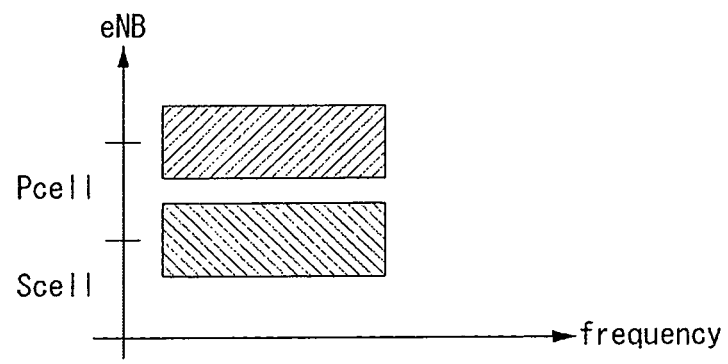
FIG. 18
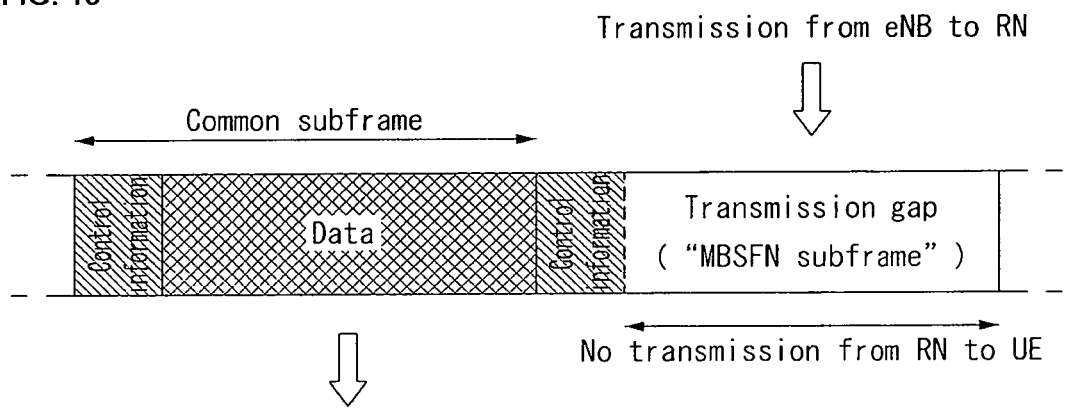

FIG. 24
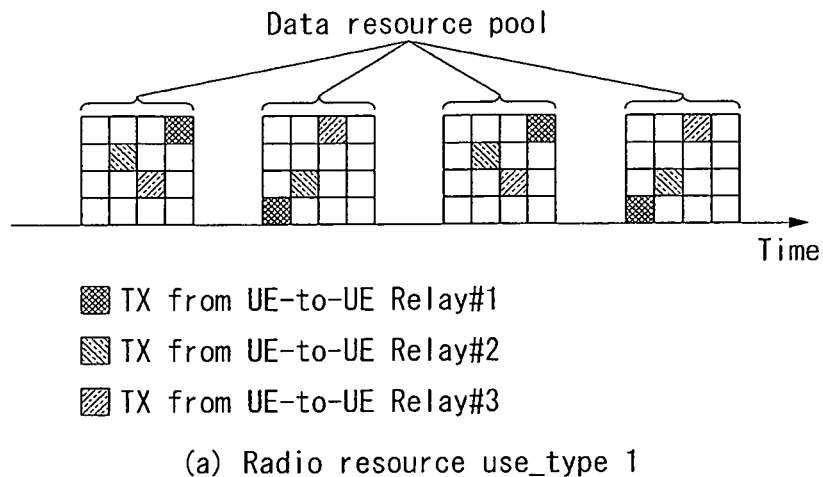
(a) Radio resource use_type 1
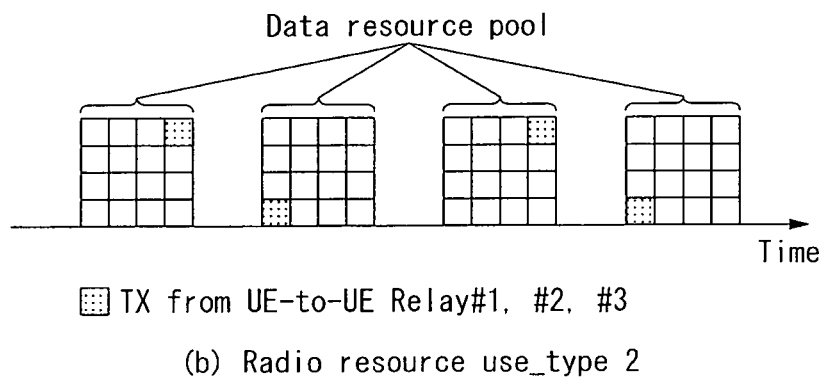
(b) Radio resource use_type 2

FIG. 26
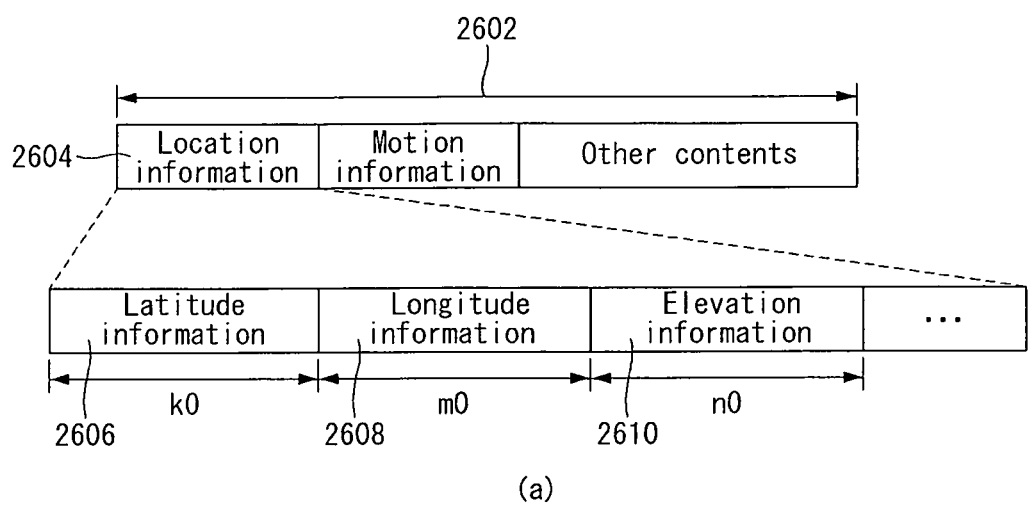
(a)
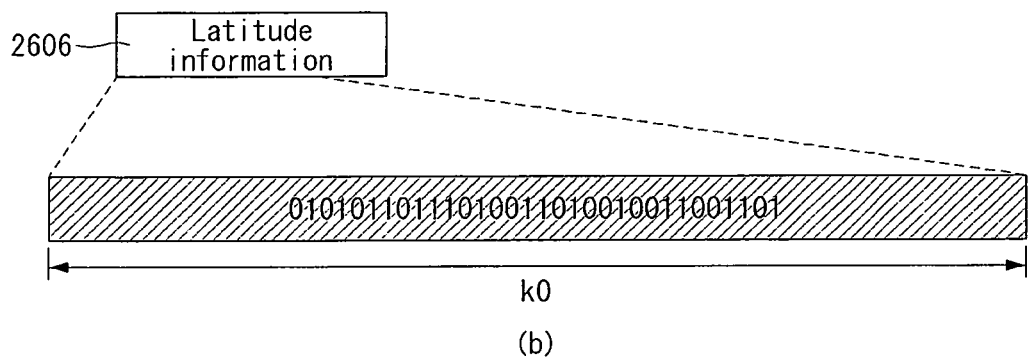
(b)

FIG. 30
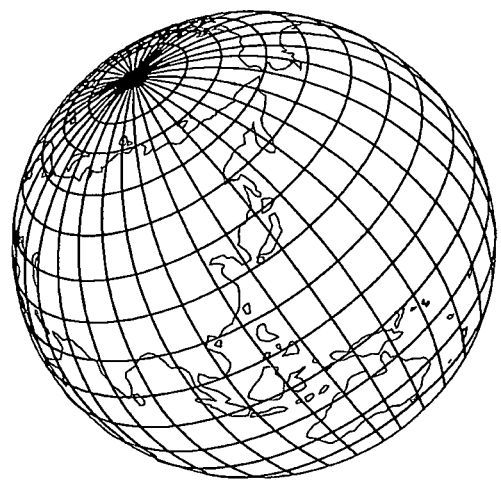
(a)
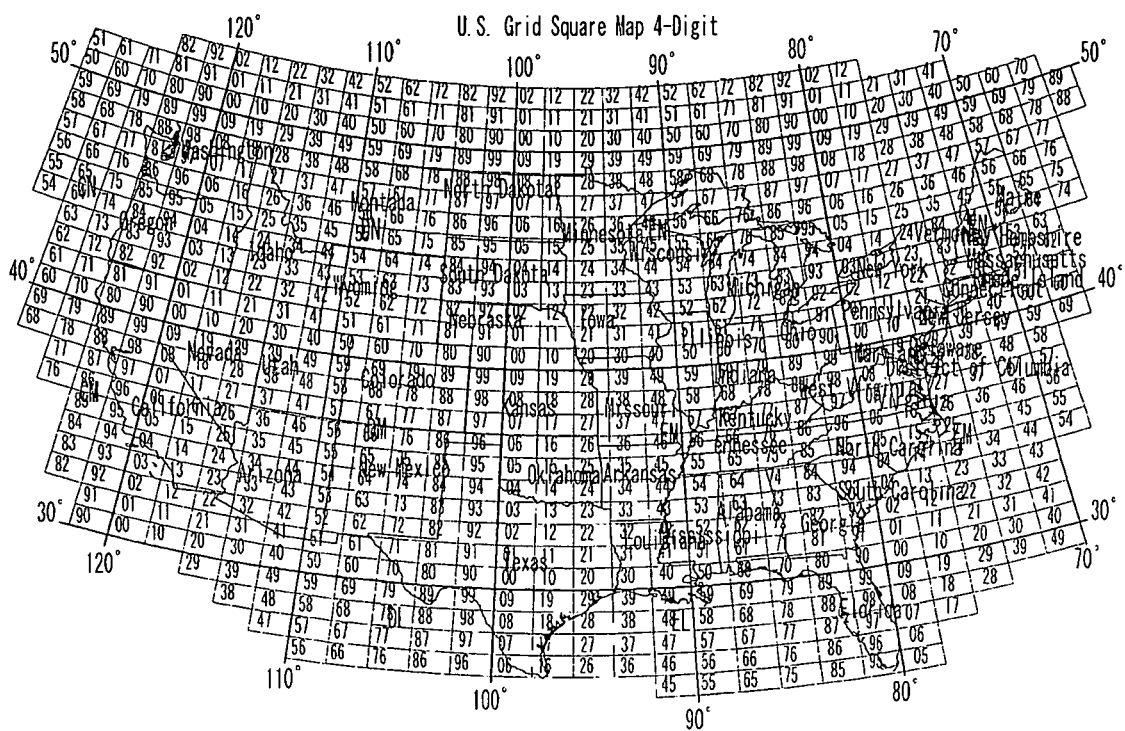
(b)

METHOD FOR TRANSMITTING V2X MESSAGE IN WIRELESS COMMUNICATION SYSTEM, AND APPARATUS THEREOF

CROSS REFERENCE TO RELATED APPLICATIONS

This application is the National Phase of PCT/KR2017/001828 filed on Feb. 20, 2017, which claims priority under 35 U.S.C. § 119(e) to U.S. Provisional Application No. 62/297,808 filed on Feb. 20, 2016, all of which are hereby expressly incorporated by reference into the present application.

TECHNICAL FIELD

The present invention relates to a wireless communication system and, more particularly, to a method of transmitting a V2X message and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

There is a problem in that unnecessary overhead occurs if a specific network entity transmits a redundant part between a plurality of V2X messages received from a plurality of UEs to the UEs without any change without taking into consideration the redundant part.

In order to solve the aforementioned problem, the present invention proposes a method of efficiently transmitting a V2X message by taking into consideration a redundant part in a wireless communication system.

Specifically, the present invention proposes a method for a specific network entity to broadcast a V2X message including only one of a plurality of common information elements received from a plurality of UEs.

Furthermore, the present invention proposes a method for a specific network entity to broadcast a V2X message not including a common information element if the common information element is pre-defined between a UE and/or the network entity or if the UE has received the common information element through higher layer signaling.

Furthermore, the present invention proposes a method of setting location information of a UE based on a quantization method with respect to a specific country and/or a specific region.

Technical objects to be achieved by the present invention are not limited to the aforementioned technical objects, and other technical objects not described above may be evidently understood by a person having ordinary skill in the art to which the present invention pertains from the following description.

Technical Solution

A method of transmitting a V2X message in a wireless communication system supporting vehicle-to-everything (V2X) communication according to an embodiment of the present invention is performed by a first user equipment (UE), and includes receiving, from a plurality of second UEs, a plurality of V2X messages, generating a specific V2X message based on the plurality of received V2X messages, and transmitting, to at least one third UE, the generated specific V2X message. Each of the plurality of received V2X messages includes a common information element related to the plurality of second UEs, and a dedicated information element configured for each UE. The specific V2X message includes a plurality of dedicated information elements corresponding to the plurality of second UEs, which are received from the plurality of second UEs, and the common information element.

Furthermore, preferably, the common information element included in the specific V2X message may include a common information element received from any one of the plurality of second UEs.

Furthermore, preferably, the common information element related to the plurality of second UEs may include a value identically configured with respect to the plurality of second UEs.

Furthermore, preferably, the common information element may be included in a specific field of the header of the specific V2X message.

Furthermore, preferably, the common information element may included in the specific V2X message by encoding along with the plurality of dedicated information elements.

Furthermore, preferably, the specific V2X message may be transmitted to the at least one third UE, using a Uu interface or a PC5 interface.

Furthermore, preferably, the common information element may include a specific information element of information elements indicating the locations of the plurality of second UEs.

Furthermore, preferably, the specific information element may include at least one specific upper bit of a plurality of bits indicating the locations of the plurality of second UEs.

Furthermore, preferably, the at least one specific upper bit may include at least one bit indicating at least one of a specific country and specific region in which the first UE is located.

Furthermore, preferably, the at least one bit may be determined based on a public land mobile network (PLMN).

Furthermore, preferably, the dedicated information element may include at least one of the identifier (ID) of a UE, the ID of a V2X message or the ID of a network entity supporting the UE.

A first user equipment (UE) transmitting a V2X message in a wireless communication system supporting vehicle-to-everything (V2X) communication another embodiment of the present invention includes a transceiver for transmitting and receiving radio signals and a processor functionally connected to the transceiver. The processor controls to receive, from a plurality of second UEs, a plurality of V2X messages, to generate a specific V2X message based on the plurality of received V2X messages, and to transmit, to at least one third UE, the generated specific V2X message. Each of the plurality of received V2X messages may include a common information element related to the plurality of second UEs, and a dedicated information element configured for each UE. The specific V2X message may include a plurality of dedicated information elements corresponding to the plurality of second UEs, which are received from the plurality of second UEs, and the common information element.

Advantageous Effects

In accordance with the embodiment of the present invention, in performing communication between UEs (e.g., V2X communication), pieces of specific information received from a plurality of UEs can be prevented from being redundantly included in a V2X message to be subsequently transmitted to the UEs.

Unnecessary overhead for V2X message transmission and reception can be reduced because a network entity transmits a V2X message by taking into consideration a redundant part.

As a result, the safety aspect of a UE can be enhanced.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 10 illustrates a reference signal pattern mapped to a downlink resource block pair in a wireless communication system to which the present invention may be applied.

FIG. 17 is a diagram illustrating a carrier aggregation-based CoMP system in a wireless communication system to which the present invention may be applied.

FIG. 18 illustrates a relay node resource partition in a wireless communication system to which the present invention may be applied.

FIGS. 22 to 24 are diagrams illustrateing examples of a relay process and resources for relay to which the present invention may be applied.

FIG. 26 illustrates the configuration of location information of a UE to which the present invention may be applied.

FIG. 30 illustrates a method of classifying location information with respect to a specific country and/or region to which the present invention may be applied.

MODE FOR INVENTION

Figure 1:
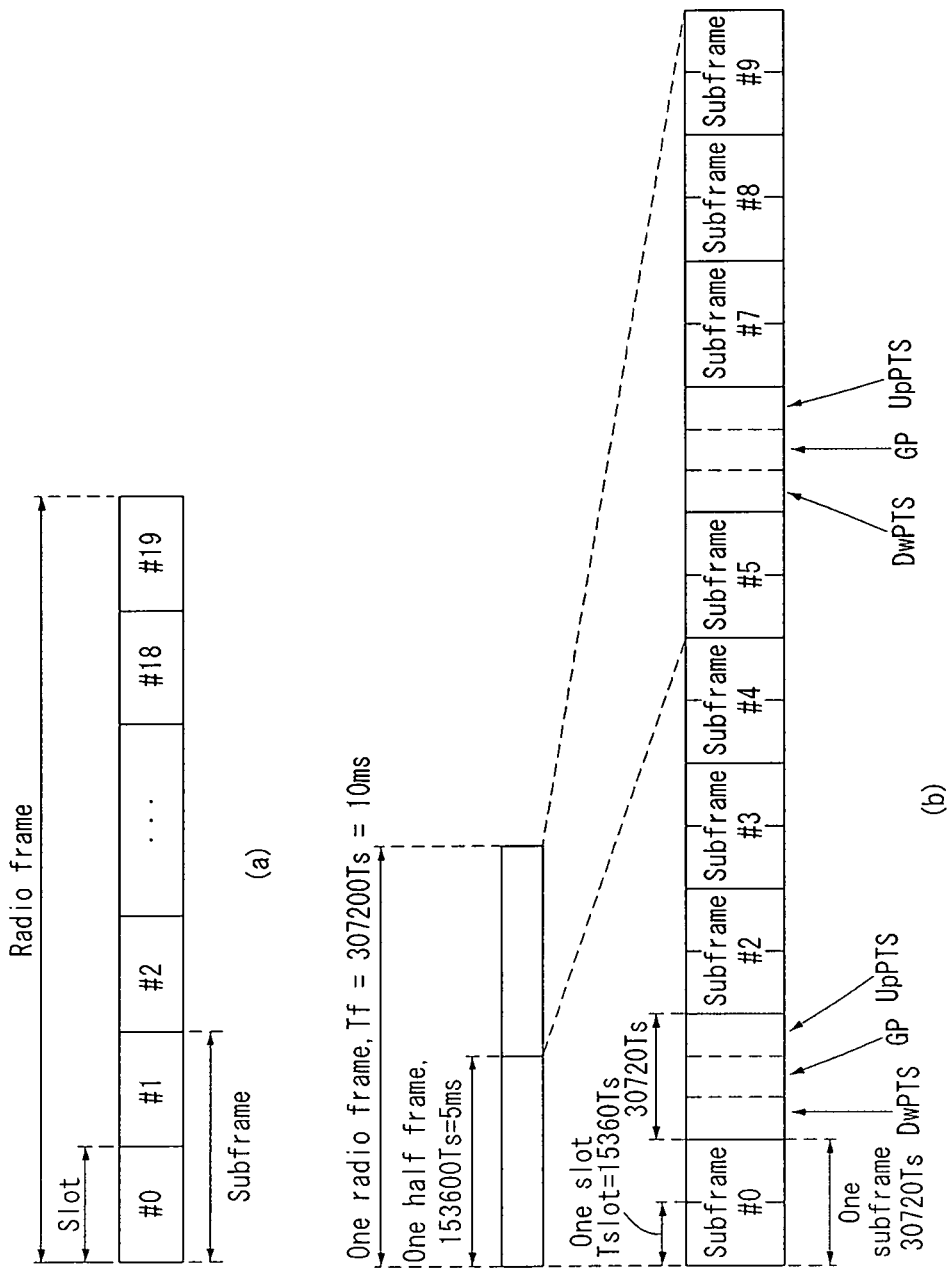
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (VVT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely illustrate the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) illustrates the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule illustrateing how uplink and downlink are allocated (or reserved) with respect to all of subframes. Table 1 illustrates the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Table 2 illustrates a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

The structure of the radio frame according to the example of FIG. 1 is only one example. The number of subcarriers included in one radio frame, the number of slots included in one subframe, and the number of OFDM symbols included in one slot may be changed in various manners.

Figure 2:
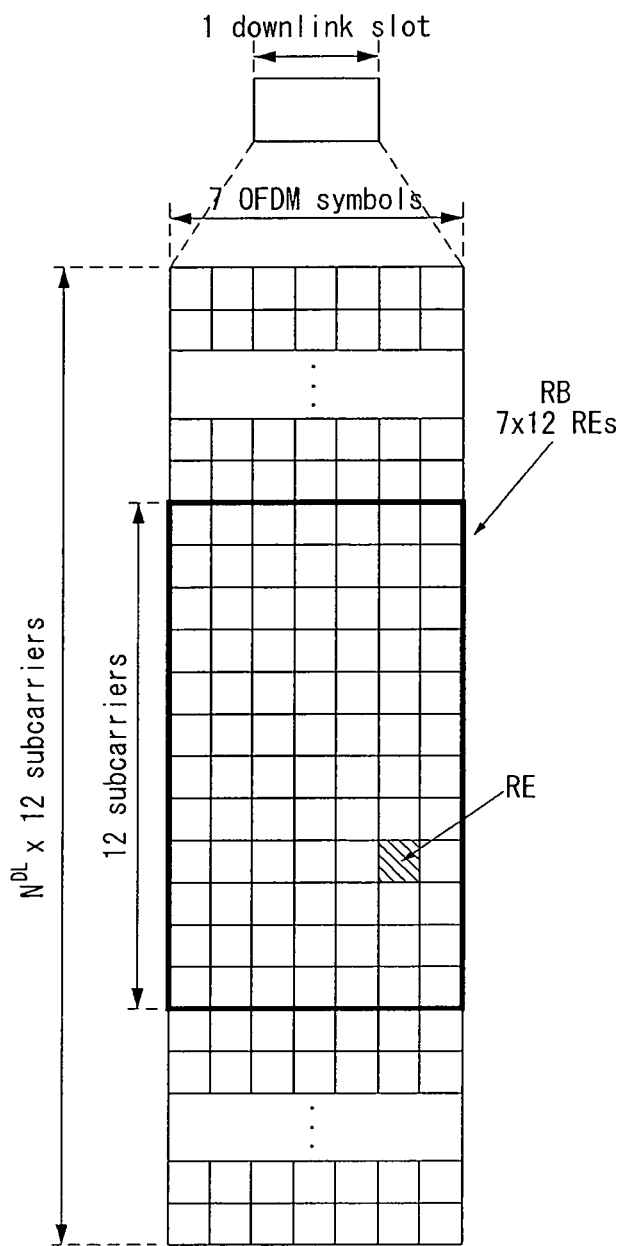
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
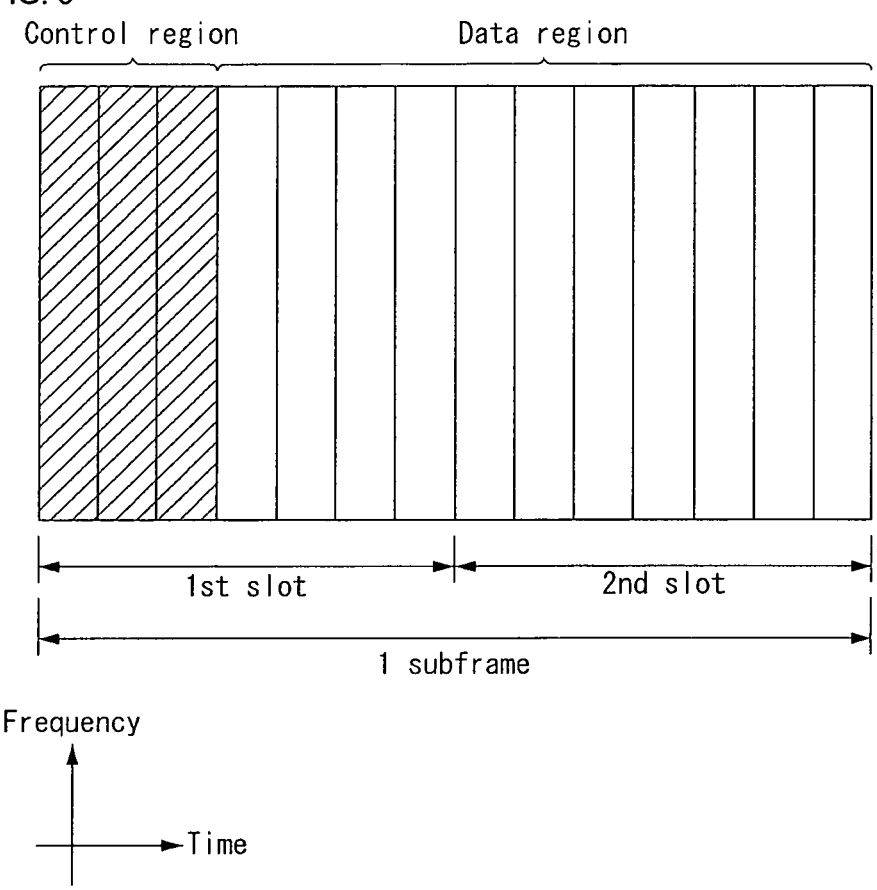
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

Figure 4:
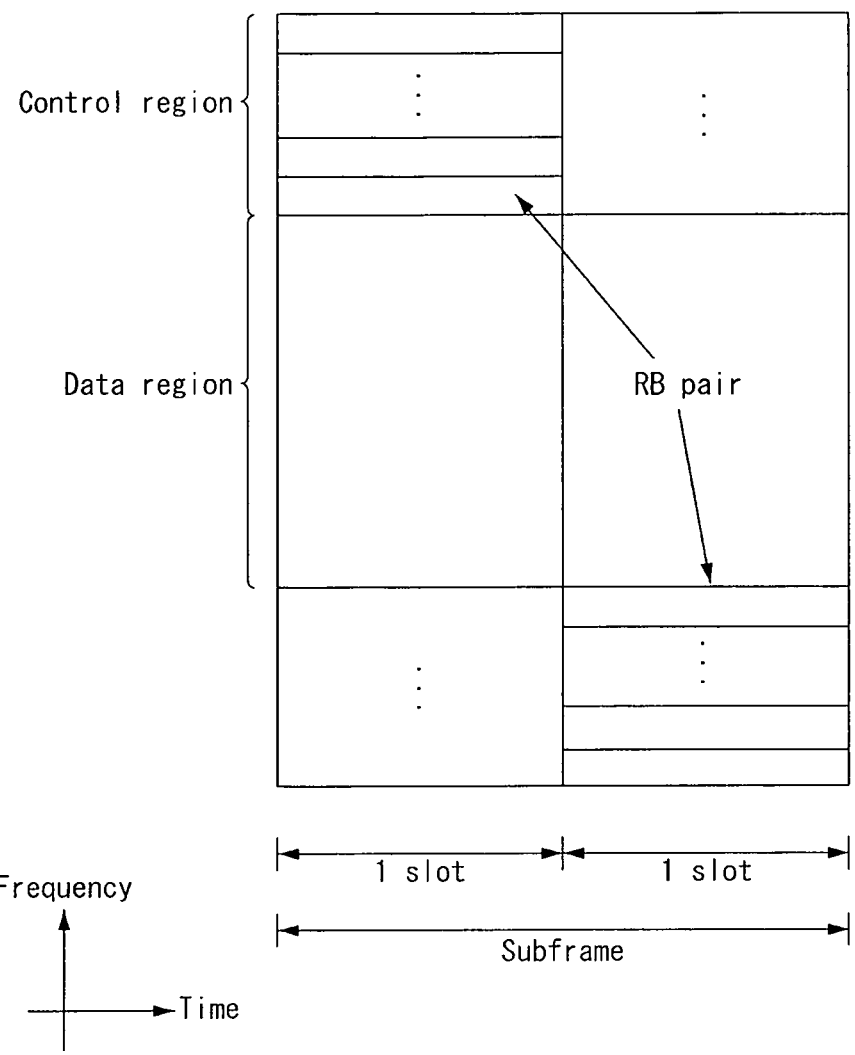
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical uplink control channel (PUCCH)

Uplink control information (UCI) transmitted through a PUCCH may include the following scheduling request (SR), HARQ ACK/NACK information, and downlink channel measurement information.

Scheduling Request (SR): The SR is information used for requesting an uplink UL-SCH resource. The SR is transmitted using an On-off Keying (OOK) method.

HARQ ACK/NACK: The HARQ ACK/NACK is a response signal to a downlink data packet on a PDSCH. The HARQ ACK/NACK represents whether a downlink data packet is successfully received. ACK/NACK 1 bit is transmitted in response to a single downlink codeword, and ACK/NACK 2 bits are transmitted in response to two downlink codewords.

Channel State Information (CSI): The CSI is feedback information about a downlink channel. CSI may include at least one of a Channel Quality Indicator (CQI), a rank indicator (RI), a Precoding Matrix Indicator (PMI), and a Precoding Type Indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as illustrated in Table 3 given below.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK. In the case of an extended CP, PUCCH format 2 may be transmitted for transmitting the CQI and the HARQ ACK/NACK.

PUCCH format 3 is used for carrying encoded UCI of 48 bits. The PUCCH format 3 may carry HARQ ACK/NACK of a plurality of serving cells, SR (when existing), and CSI report of one serving cell.

Figure 5:
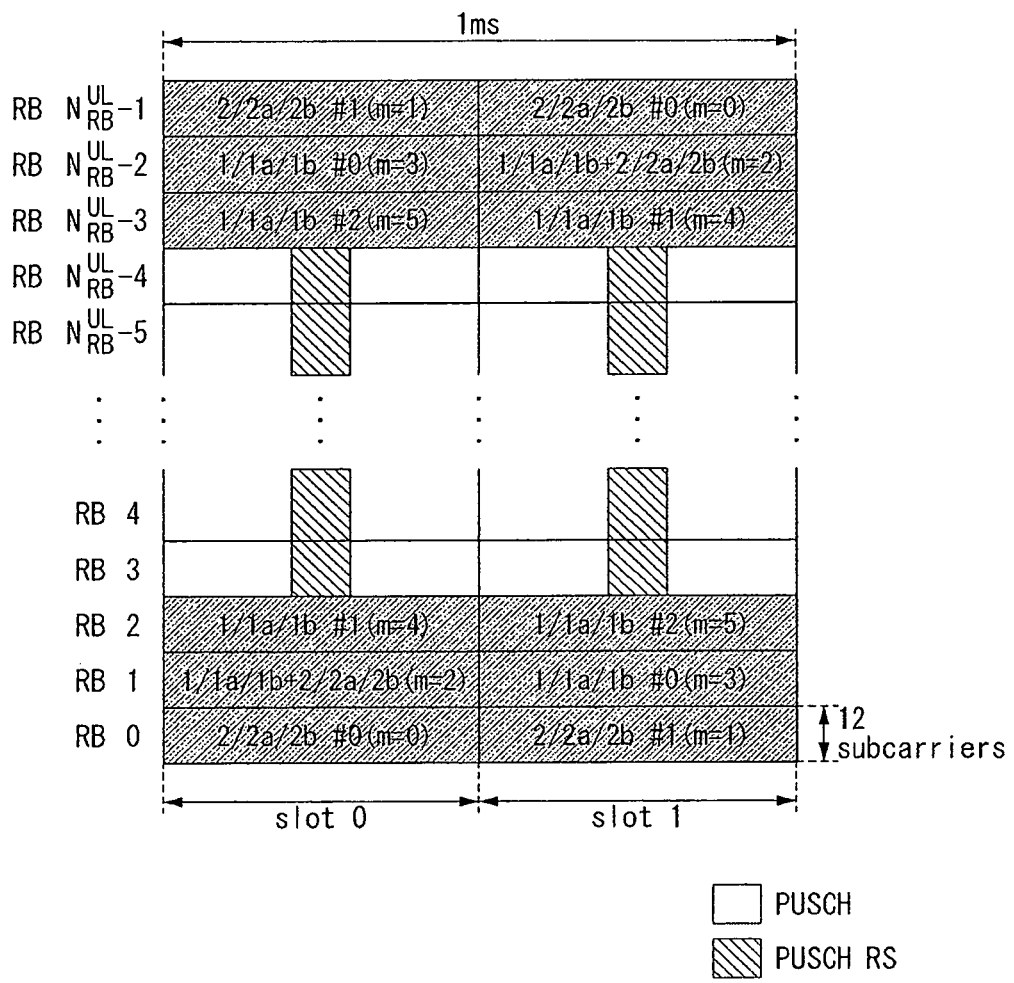
FIG. 5 illustrates an example of the shape in which PUCCH formats are mapped to the PUCCH region of uplink physical resource block in a wireless communication system to which the present invention may be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
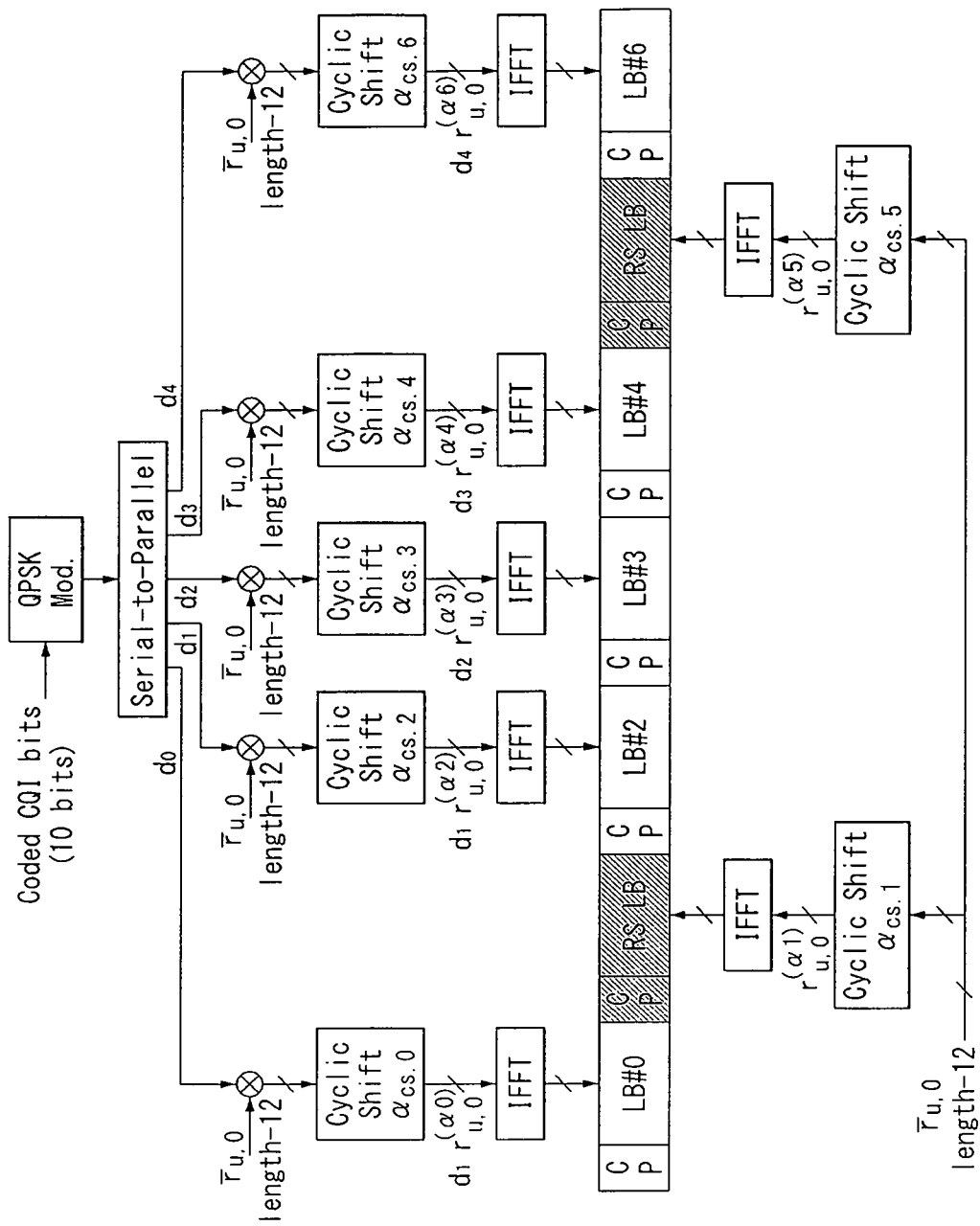
FIG. 6 illustrates a structure of CQI channel in the case of normal CP in a wireless communication system to which the present invention may be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

Hereinafter, PUCCH formats 1a and 1 b will be described.

In the PUCCH format 1a/1b, a symbol modulated using a BPSK or QPSK modulation method is multiplied with a CAZAC sequence of a length 12. For example, a result in which a CAZAC sequence r (n) (n=0, 1, 2, . . . , N−1) of a length N is multiplied to a modulation symbol d(0) becomes y(0), y(1), y(2), . . . , y(N−1). y(0), y(1), y(2), . . . , y(N−1) symbols may be referred to as a block of symbol. After a CAZAC sequence is multiplied to a modulation symbol, block-wise diffusion using an orthogonal sequence is applied.

A Hadamard sequence of a length 4 is used for general ACK/NACK information, and a Discrete Fourier Transform (DFT) sequence of a length 3 is used for shortened ACK/NACK information and a reference signal.

A Hadamard sequence of a length 2 is used for a reference signal of an extended CP.

Figure 7:
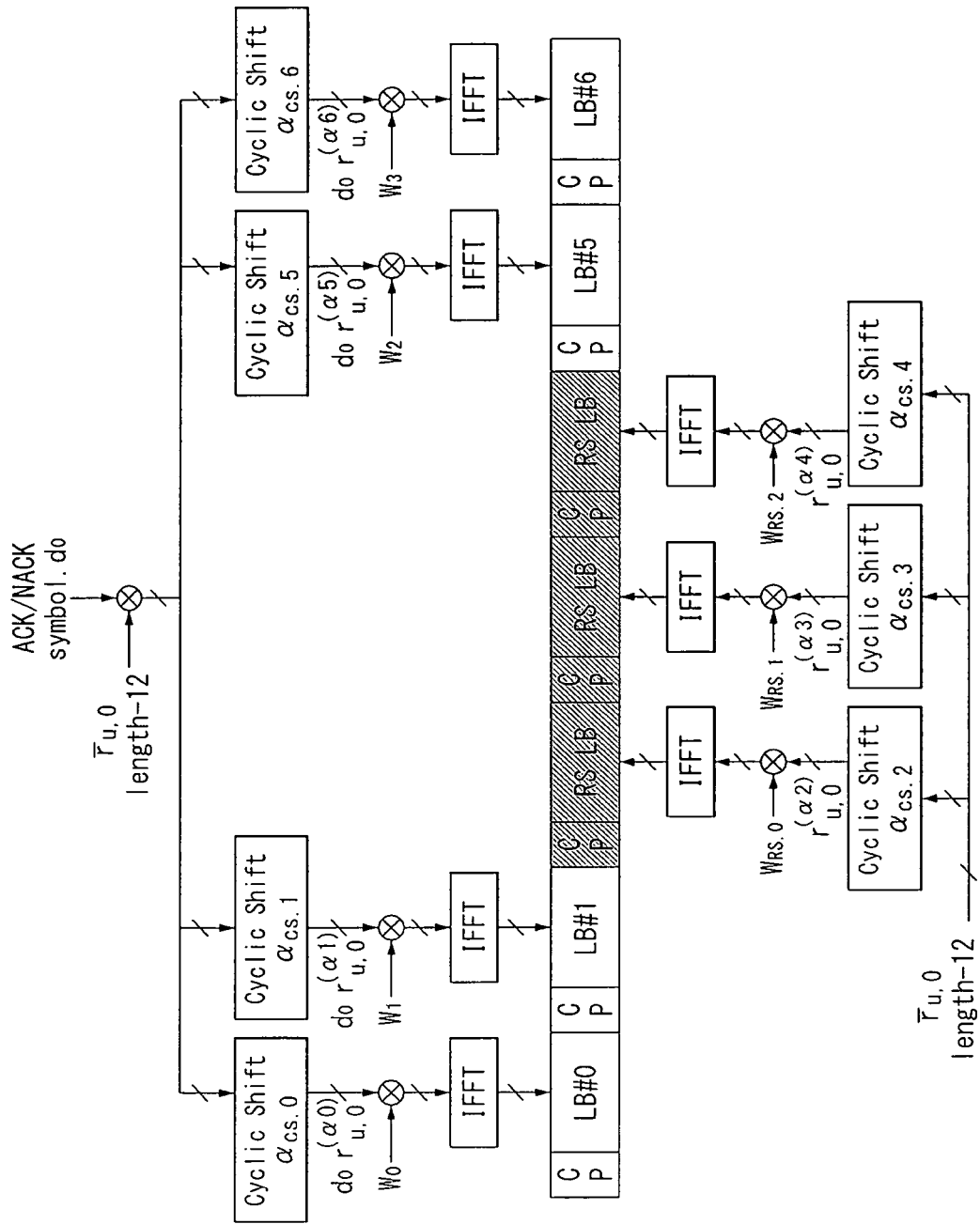
FIG. 7 illustrates a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spread scheme is described in detail later with reference to FIG. 14.

PUCCH Piggybacking

Figure 8:
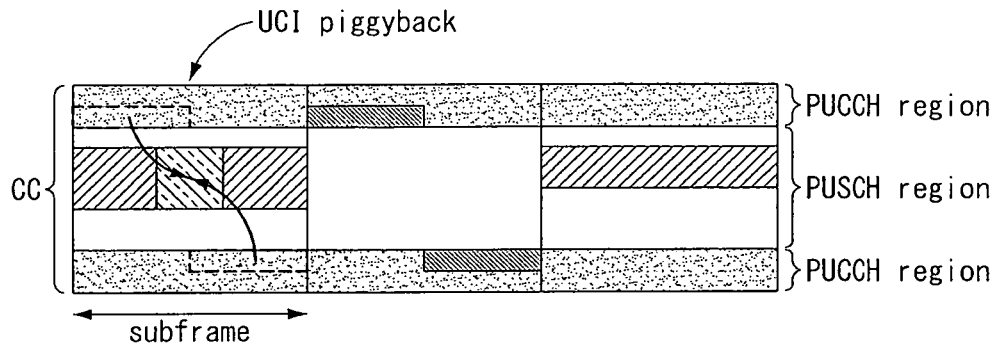
FIG. 8 illustrates an example of transmission channel processing of UL-SCH in a wireless communication system to which the present invention may be applied.

FIG. 8 illustrates one example of transport channel processing of a UL-SCH in the wireless communication system to which the present invention can be applied.

Figure 11:
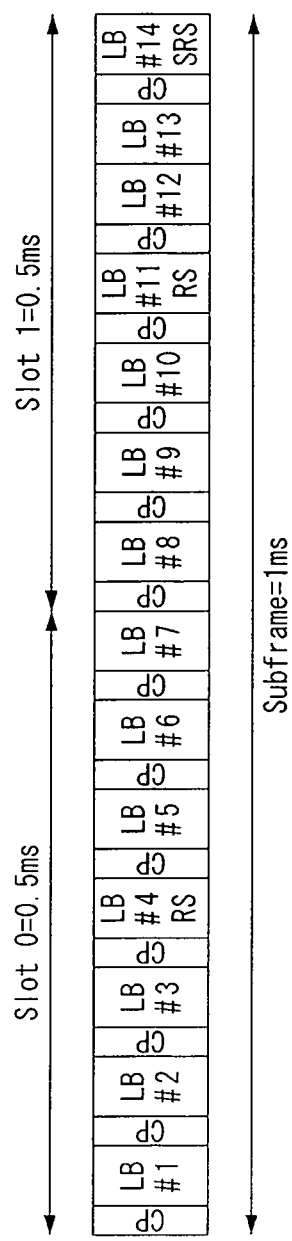
FIG. 11 illustrates an uplink subframe including a sounding reference signal symbol in a wireless communication system to which the present invention may be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 9:
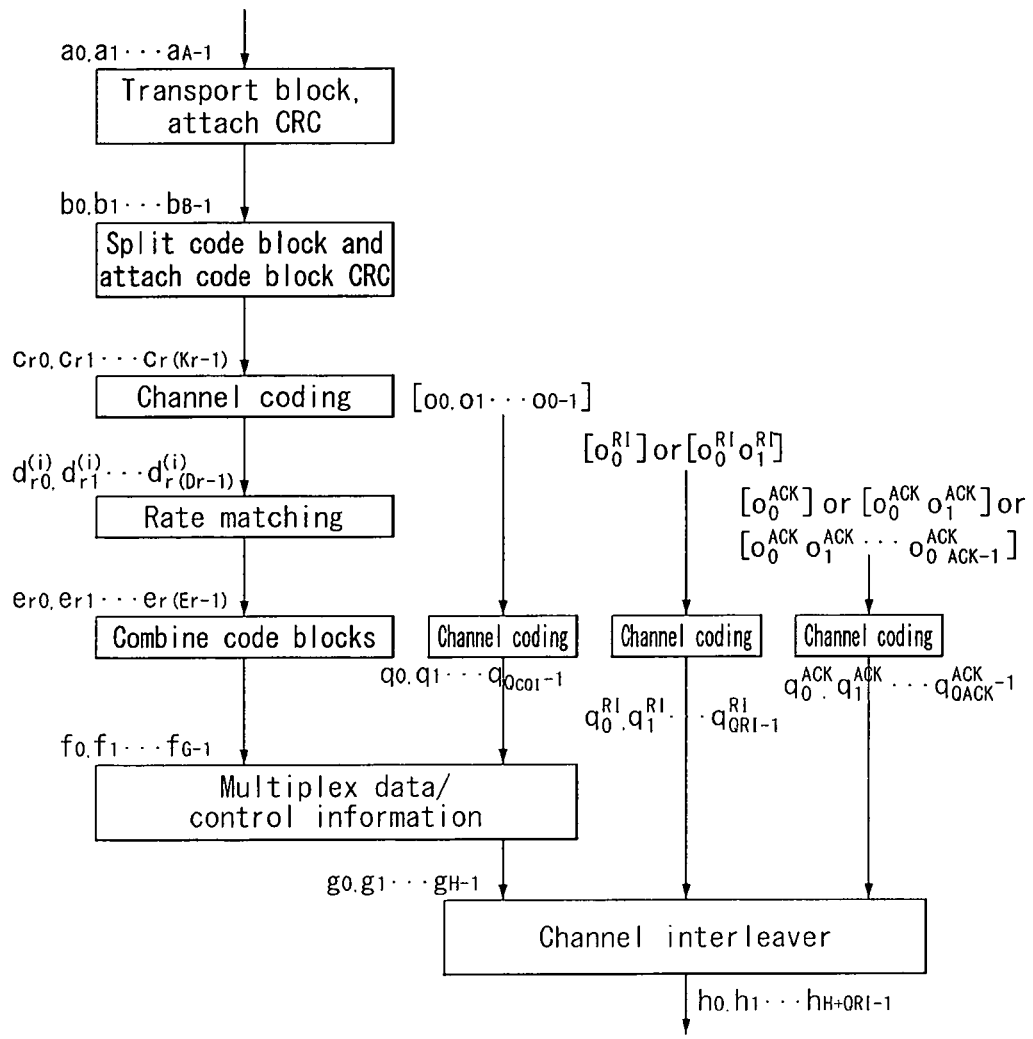
FIG. 9 illustrates an example of signal processing process of uplink shared channel which is a transport channel in a wireless communication system to which the present invention may be applied.

FIG. 9 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 9, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S90). In this case, A represents the size of the transport block and L represents the number of parity bits. Input bits to which the CRC is attached are illustrated in $b_0, b_1, b_2, b_3, \ldots b_{B-1}$. In this case, B represents the number of bits of the transport block including the CRC.

$b_0, b_1, b_2, b_3, \ldots b_{B-1}$ is segmented into multiple code blocks (CBs) according to the size of the TB and the CRC is attached to multiple segmented CBs (S91). Bits after the code block segmentation and the CRC attachment are illustrated in $c_{r0}, c_{r1}, c_{r2}, c_{r3}, \ldots, c_{r(K_r-1)}$. Herein, r represents No. (r=0, . . . , C−1) of the code block and Kr represents the bit number depending on the code block r. Further, C represents the total number of code blocks.

Subsequently, channel coding is performed (S92). Output bits after the channel coding are illustrated in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, . . . , C−1) and C represents the total number of code blocks. Each code block may be encoded by turbo coding.

Subsequently, rate matching is performed (S93). Bits after the rate matching are illustrated in $e_{r0}, e_{r1}, e_{r2}, e_{r3}, \ldots, e_{r(E_r-1)}$. In this case, r represents the code block number (r=0, . . . , C−1) and C represents the total number of code blocks. Er represents the number of rate-matched bits of the r-th code block.

Subsequently, concatenation among the code blocks is performed again (S94). Bits after the concatenation of the code blocks is performed are illustrated in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S96, S97, and S98). Since different encoded symbols are allocated for transmitting each piece of control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S94, encoded bits $f_0, f_1, f_2, f_3, \ldots, f_{G-1}$ of the UL-SCH data and encoded bits $q_0, q_1, q_2, q_3, \ldots, q_{N_L Q_{CQI}-1}$ of the CQI/PMI are multiplexed (S95). A multiplexed result of the data and the CQI/PMI is illustrated in $g_0, g_1, g_2, g_3, \ldots, g_{H'-1}$. In this case, $g_i$ (i=0, ..., H'−1) represents a column vector having a length of $(Q_m \cdot N_L)$. $H=(G+N_L \cdot Q_{CQI})$ and $H'=HI(N_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S99).

Reference Signal(RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.

A cell-specific reference signal (CRS)

A multicast-broadcast single-frequency network reference signal (MBSFN RS)

A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in $\Delta f$=15 kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, ..., u+6.

In this case, u is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in $\Delta f$=15 kHz.

The CSI-RS is transmitted in 1, 2, 4 or 8 antenna ports using p=15, p=15, 16, p=15, ..., 18 and p=15, ..., 22, respectively.

The CSI-RS is defined only in $\Delta f$=15 kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

FIG. 10 illustrates a reference signal pattern mapped to a downlink resource block pair in the wireless communication system to which an embodiment of the present invention may be applied.

Referring to FIG. 10, as a unit in which the reference signal is mapped, the downlink resource block pair may be expressed by one subframe in the time domain×12 subcarriers in the frequency domain.

That is, one resource block pair has a length of 14 OFDM symbols in the case of a normal cyclic prefix (CP) (FIG. 14(a)) and a length of 12 OFDM symbols in the case of an extended cyclic prefix (CP) (FIG. 14(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 illustrates the case of the normal CP and Equation 3 illustrates the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3 given above, k and p represent the subcarrier index and the antenna port, respectively. $N_{RB}^{DL}$, ns, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 1 to 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 11 illustrates an uplink subframe including a sounding reference signal symbol in the wireless communication system to which the present invention can be applied.

Referring to FIG. 11, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished from each other by allocating different base sequences to respective cells, but orthogonality between different base sequences is not secured.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used interchangeably with the term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell) The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 12:
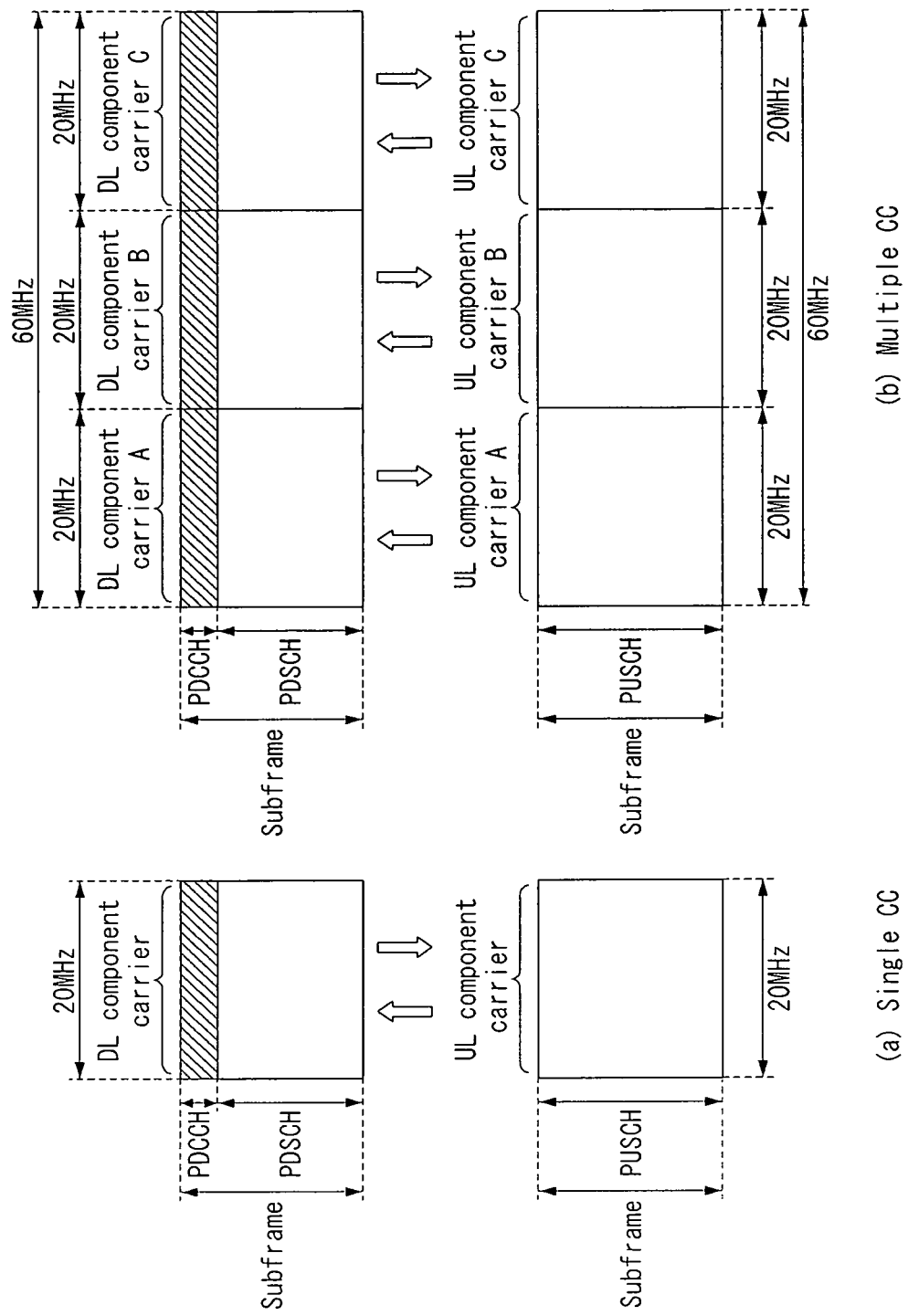
FIG. 12 illustrates an example of component carrier and carrier aggregation in a wireless communication system to which the present invention may be applied.

FIG. 12 illustrates examples of a component carrier and carrier aggregation in the wireless communication system to which the present invention can be applied.

FIG. 12 (a) illustrates a single carrier structure used in an LTE system. The component carrier includes the DL CC and the UL CC. One component carrier may have a frequency range of 20 MHz.

FIG. 12 (b) illustrates a carrier aggregation structure used in the LTE system. In the case of FIG. 12 (b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 13:
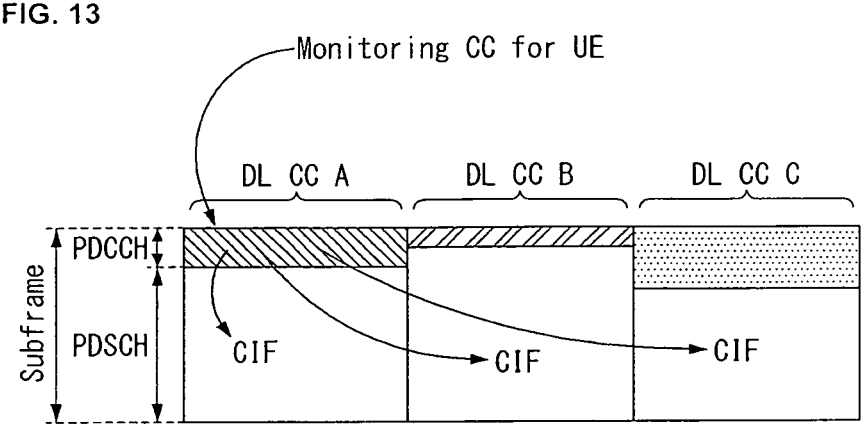
FIG. 13 illustrates an example of subframe structure according to cross carrier scheduling in a wireless communication system to which the present invention may be applied.

FIG. 13 illustrates one example of a subframe structure depending on cross carrier scheduling in the wireless communication system to which the present invention can be applied.

Referring to FIG. 13, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC'A' may transmit the PDCCH scheduling the PDSCH thereof or the PDSCH of another CC by using the CIF. In this case, DL CC'B' and 'C' in which the PDCCH monitoring DL CC is not configured does not transmit the PDCCH.

PDCCH Transmission

An eNB determines a PDCCH format depending on a DCI to be transmitted to a UE and attaches cyclic redundancy check (CRC) to control information. The CRC is masked with a unique identifier (this is called a radio network temporary identifier (RNTI)) depending on the owner or use of the PDCCH. If the PDCCH is a PDCCH a specific UE, the CRC may be masked with a unique identifier of the UE, for example, a cell-RNTI (C-RNTI). Or if the PDCCH is a PDCCH for a paging message, the CRC may be masked with a paging indication identifier, for example, a paging-RNTI (P-RNTI). If the PDCCH is a PDCCH for system information, more specifically, a system information block (SIB), the CRC may be masked with a system information identifier, a system information RNTI (SI-RNTI). In order to indicate a random access response, that is, a response to the transmission of the random access preamble of the UE, the CRC may be masked with a random access-RNTI (RA-RNTI).

Next, the eNB generates coded data by performing channel coding on the control information to which the CRC has been added. In this case, the eNB may perform the channel coding at a code rate according to an MCS level. The eNB performs rate matching according to a CCE aggregation level allocated to a PDCCH format, and generates modulation symbols by modulating the coded data. In this case, a modulation rank according to the MCS level may be used. In modulation symbols forming one PDCCH, a CCE aggregation level may be one of 1, 2, 4 and 8. Thereafter, the eNB maps the modulation symbols to a physical resource element (CCE to RE mapping).

A plurality of PDCCHs may be transmitted within one subframe. That is, the control region of one subframe consists of a plurality of CCEs having indices 0~$N_{CCE,k}-1$. In this case, $N_{CCE,k}$ means a total number of CCEs within the control region of a k-th subframe. The UE monitors a plurality of PDCCHs every subframe.

In this case, the monitoring means that the UE attempts the decoding of each PDCCH depending on a PDCCH format that is monitored. In the control region allocated within a subframe, the eNB does not provide the UE with information regarding that where is a corresponding PDCCH. In order to receive a control channel transmitted by the eNB, the UE is unaware that its own PDCCH is transmitted at which CCE aggregation level or DCI format at which location. Accordingly, the UE searches the subframe for its own PDCCH by monitoring a set of PDCCH candidates. This is called blind decoding/detection (BD). Blind decoding refers to a method for a UE to de-mask its own UE identifier (UE ID) from a CRC part and to check whether a corresponding PDCCH is its own control channel by reviewing a CRC error.

In the active mode, the UE monitors a PDCCH every subframe in order to receive data transmitted thereto. In the DRX mode, the UE wakes up in the monitoring interval of a DRX period and monitors a PDCCH in a subframe corresponding to the monitoring interval. A subframe in which the monitoring of the PDCCH is performed is called a non-DRX subframe.

In order to receive a PDCCH transmitted to the UE, the UE needs to perform blind decoding on all of CCEs present in the control region of a non-DRX subframe. The UE is unaware that which PDCCH format will be transmitted, and thus has to decode all of PDCCHs at a CCE aggregation level until the blind decoding of the PDCCHs is successful within the non-DRX subframe. The UE needs to attempt detection at all of CCE aggregation levels until the blind decoding of a PDCCH is successful because it is unaware that the PDCCH for the UE will use how many CCEs. That is, the UE performs blind decoding for each CCE aggregation level. That is, the UE first attempts decoding by setting a CCE aggregation level unit to 1. If decoding fully fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts blind decoding on all of a C-RNTI, P-RNTI, SI-RNTI and RA-RNTI. Furthermore, the UE attempts blind decoding on all of DCI formats that need to be monitored.

As described above, if the UE performs blind decoding on all of possible RNTIs, all of DCI formats to be monitored and for each of all of CCE aggregation levels, the number of detection attempts is excessively many. Accordingly, in the LTE system, a search space (SS) concept is defined for the blind decoding of a UE. The search space means a PDCCH candidate set for monitoring, and may have a different size depending on each PDCCH format.

The search space may include a common search space (CSS) and a UE-specific/dedicated search space (USS). In the case of the common search space, all of UEs may be aware of the size of the common search space, but a UE-specific search space may be individually configured for each UE. Accordingly, in order to decode a PDCCH, a UE must monitor both the UE-specific search space and the common search space, and thus performs a maximum of 44 times of blind decoding (BD) in one subframe. This does not include blind decoding performed based on a different CRC value (e.g., C-RNTI, P-RNTI, SI-RNTI, RA-RNTI).

There may be a case where an eNB cannot secure CCE resources for transmitting a PDCCH to all of UEs to which the PDCCH is to be transmitted within a given subframe due to a smaller search space. The reason for this is that resources left over after a CCE location is allocated may not be included in the search space of a specific UE. In order to minimize such a barrier that may continue even in a next subframe, a UE-specific hopping sequence may be applied to the point at which the UE-specific search space starts.

Table 4 illustrates the size of the common search space and the UE-specific search space.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for the DCI formats 0 and 1A in the UE-specific search space. In this case, the DCI formats 0 and 1A have the same size, but the UE may distinguish between the DCI formats using a flag for the DCI format 0/format 1A differentiation included in a PDCCH. Furthermore, a different DCI format in addition to the DCI formats 0 and 1A may be required for the UE depending on a PDSCH transmission mode configured by an eNB. For example, the DCI formats 1, 1B and 2 may be required for the UE.

The UE may search the common search space for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier other than a UE-specific identifier.

A search space $S_k^{(L)}$ means a PDCCH candidate set according to an aggregation level $L \in \{1,2,4,8\}$. A CCE according to the PDCCH candidate set m in of the search space may be determined by Equation 4.

$$L \cdot \{(Y_k+m) \bmod \lfloor N_{CCE,k}/L \rfloor\}+i \qquad \text{[Equation 4]}$$

In this case, $M^{(L)}$ indicates the number of PDCCH candidates according to a CCE aggregation level L for monitoring in the search space, and m=0, Λ:$M^{(L)}$−1. i is an index for designating an individual CCE in each PDCCH candidate, and is i=0, Λ, L−1.

As described above, in order to decode a PDCCH, the UE monitors both the UE-specific search space and the common search space. In this case, the common search space (CSS) supports PDCCHs having an aggregation level of {4, 8}, and the UE-specific search space (USS) supports PDCCHs having an aggregation level of {1, 2, 4, 8}.

Table 5 illustrates DCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, in the case of the common search space, $Y_k$ is set to 0 with respect to two aggregation levels L=4 and L=8. In contrast, with respect to an aggregation level L, in the case of the UE-specific search space, $Y_k$ is defined as in Equation 5.

$$Y_k = (A \cdot Y_{k-1}) \bmod D \quad \text{[Equation 5]}$$

In this case, $Y_{-1} = N_{RNTI} \neq 0$, and an RNTI value used for $n_{RNTI}$ may be defined as one of the identifications of the UE. Furthermore, A=39827, D=65537, and $k = \lfloor n_s/2 \rfloor$. In this case, $n_s$ indicates the slot number (or index) of a radio frame.

ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as illustrated in Table 6 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6 given above, HARQ-ACK(i) represents an ACK/NACK result for an i-th data unit. In Table 6 given above, discontinuous transmission (DTX) means that there is no data unit to be transmitted for the corresponding HARQ-ACK(i) or that the terminal may not detect the data unit corresponding to the HARQ-ACK(i).

According to Table 6 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails in decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Block Spread Scheme

Unlike the existing PUCCH format 1 series or 2 series, a block spread scheme is a method for modulating control signal transmission using an SC-FDMA method. As illustrated in FIG. 14, a symbol sequence may be spread on the time domain using orthogonal cover code (OCC) and transmitted. The control signals of a plurality of UEs may be multiplexed on the same RB using the OCC. In the case of the PUCCH format 2, one symbol sequence is transmitted over the time domain, and the control signals of a plurality of UEs are multiplexed using a cyclic shift (CS) of a CAZAC sequence. In contrast, in the case of the block spread-based PUCCH format (e.g., PUCCH format 3), one symbol sequence is transmitted over the frequency domain, and the control signals of a plurality of UEs are multiplexed using the time domain spread using the OCC.

Figure 14:
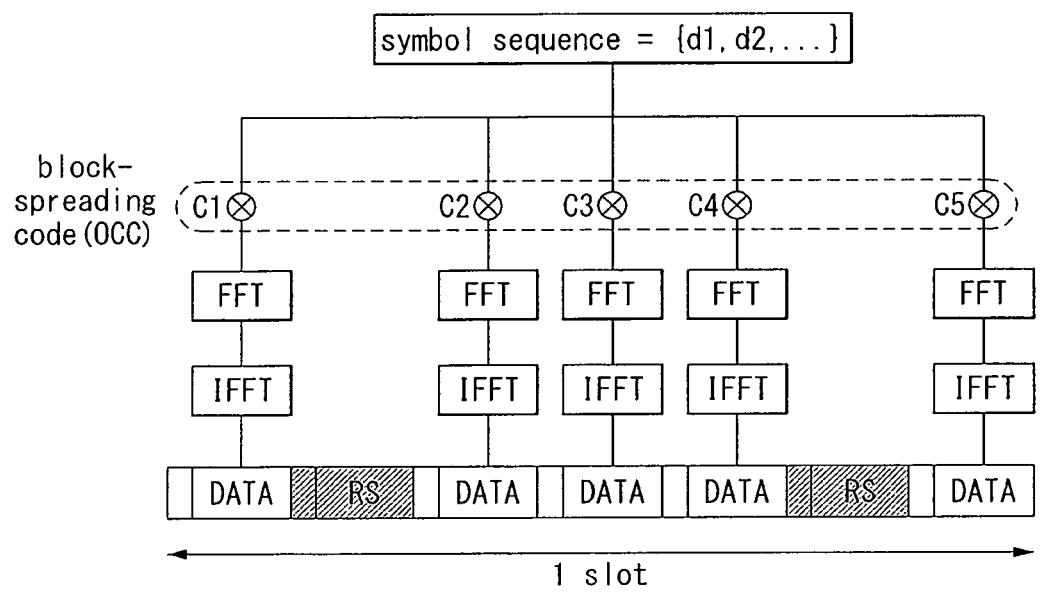
FIG. 14 illustrates an example of generating and transmitting five SC-FDMA symbols during a slot in a wireless communication system to which the present invention may be applied.

FIG. 14 illustrates one example of generating and transmitting 5 SC-FDMA symbols during one slot in the wireless communication system to which the present invention can be applied.

In FIG. 14, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 14, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

Hybrid-Automatic Repeat and Request (HARQ)

In a mobile communication system, one eNB transmits/receives data to/from a plurality of UEs through a radio channel environment in one cell/sector.

In a system operating using multiple carriers and a similar form, an eNB receives packet traffic from the wired Internet and transmits the received packet traffic to each UE using a predetermined communication method. In this case, what the eNB determines to transmit data to which UE using which frequency domain at which timing is downlink scheduling.

Furthermore, the eNB receives and demodulates data transmitted by UEs using a communication method of a predetermined form, and transmits packet traffic to the wired Internet. What an eNB determines to transmit uplink data to which UEs using which frequency band at which timing is uplink scheduling. In general, a UE having a better channel state transmits/receives data using more time and more frequency resources.

Figure 15:
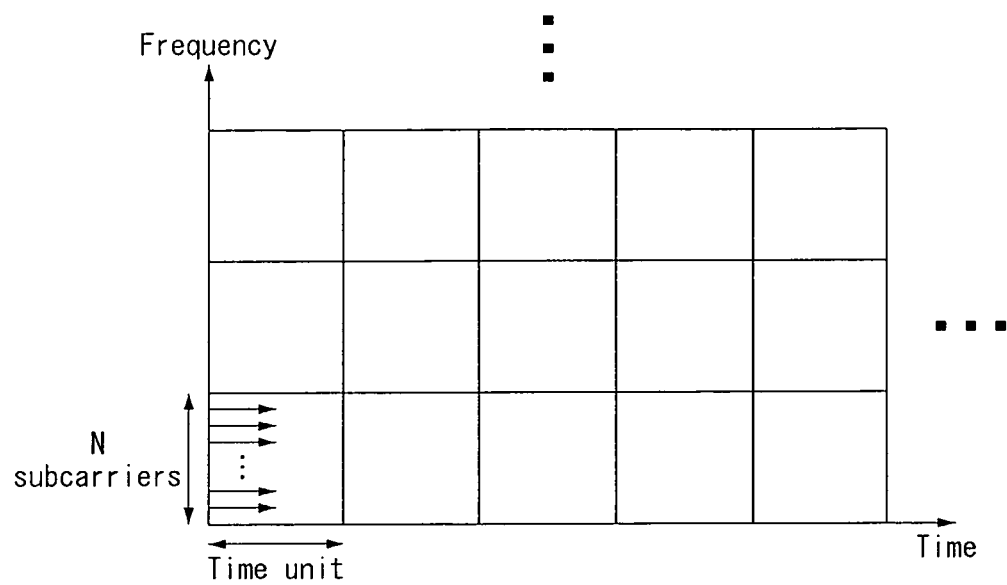
FIG. 15 is a diagram illustrating a time-frequency resource block in the time frequency domain of a wireless communication system to which the present invention may be applied.

FIG. 15 is a diagram illustrating a time-frequency resource block in the time frequency domain of a wireless communication system to which the present invention may be applied.

Resources in a system using multiple carriers and a similar form may be basically divided into time and frequency domains. The resources may be defined as a resource block. The resource block includes specific N subcarriers and specific M subframes or a predetermined time unit. In this case, N and M may be 1.

In FIG. 15, one rectangle means one resource block, and one resource block includes several subcarriers in one axis and a predetermined time unit in the other axis. In the downlink, an eNB schedules one or more resource block for a selected UE according to a predetermined scheduling rule, and the eNB transmits data to the UE using the allocated resource blocks. In the uplink, the eNB schedules one or more resource block for a selected UE according to a predetermined scheduling rule, and UEs transmits data using the allocated resources in the uplink.

After data is transmitted after scheduling, an error control method if a frame is lost or damaged includes an automatic repeat request (ARQ) method and a hybrid ARQ (HARQ) method of a more advanced form.

Basically, in the ARQ method, after one frame transmission, the reception side waits for an acknowledgement message (ACK). The reception side transmits an acknowledgement message (ACK) only when a message is properly received. If an error is generated in a frame, the reception side transmits a negative-ACK (NACK) message and deletes information about the erroneously received frame from a reception stage buffer. A transmission side transmits a subsequent frame when it receives an ACK signal is received, but retransmits the frame when it receives a NACK message.

Unlike in the ARQ method, in the HARQ method, if a received frame cannot be demodulated, the reception stage transmits a NACK message to the transmission stage, but stores the received frame in the buffer for a specific time, and combines the stored frame with a previously received frame when the frame is retransmitted, thereby increasing a reception success rate.

Recently, a more efficient HARQ method than the basic ARQ method is widely used. In addition to the HARQ method, several types are present. The HARQ method may be divided into synchronous HARQ and asynchronous HARQ depending on timing for retransmission. With respect to the amount of resources used upon retransmission, the method may be divided into a channel-adaptive method and a channel-non-adaptive method depending on whether a channel state is incorporated or not.

The synchronous HARQ method is a method in which subsequent retransmission is performed by a system at predetermined timing when initial transmission fails. That is, assuming that timing at which retransmission is performed every fourth time unit after the initial transmission fails, since an agreement has been previously made between an eNB and UEs, it is not necessary to additionally provide notification of the timing. However, if the data transmission side has received a NACK message, a frame is retransmitted every fourth time unit until an ACK message is received.

In contrast, in the asynchronous HARQ method, retransmission timing may be newly scheduled or may be performed through additional signaling. Timing at which retransmission for a previously failed frame varies due to several factors, such as a channel state.

The channel-non-adaptive HARQ method is a method in which upon retransmission, the modulation of a frame or the number of resource blocks used or adaptive modulation and coding (ACM) is performed as predetermined upon initial transmission. Unlike in the channel-non-adaptive HARQ method, the channel-adaptive HARQ method is a method in which they vary depending on the state of a channel. For example, in the channel-non-adaptive HARQ method, a transmission side transmitted data using six resource blocks upon initial transmission and retransmits data using six resource blocks likewise even upon retransmission. In contrast, although transmission has been performed using 6 resource blocks at the early stage, a method of performing retransmission using resource blocks greater than or smaller than 6 depending on a channel state is a channel-adaptive HARQ method.

Four combinations of HARQ may be performed based on such classification, but a chiefly used HARQ method includes an asynchronous channel-adaptive asynchronous, a channel-adaptive HARQ (HARQ) method, and a synchronous and channel-non-adaptive HARQ method.

The asynchronous channel-adaptive HARQ method can maximize retransmission efficiency because retransmission timing and the amount of resources used are adaptively made different depending on the state of a channel, but is not generally taken into consideration because it has a disadvantage in that it has increasing overhead.

Meanwhile, the synchronous channel-non-adaptive HARQ method has an advantage in that there is almost no overhead because timing and resource allocation for retransmission have been agreed within a system, but has a disadvantage in that retransmission efficiency is very low if it is used in a channel state in which a change is severe.

Figure 16:
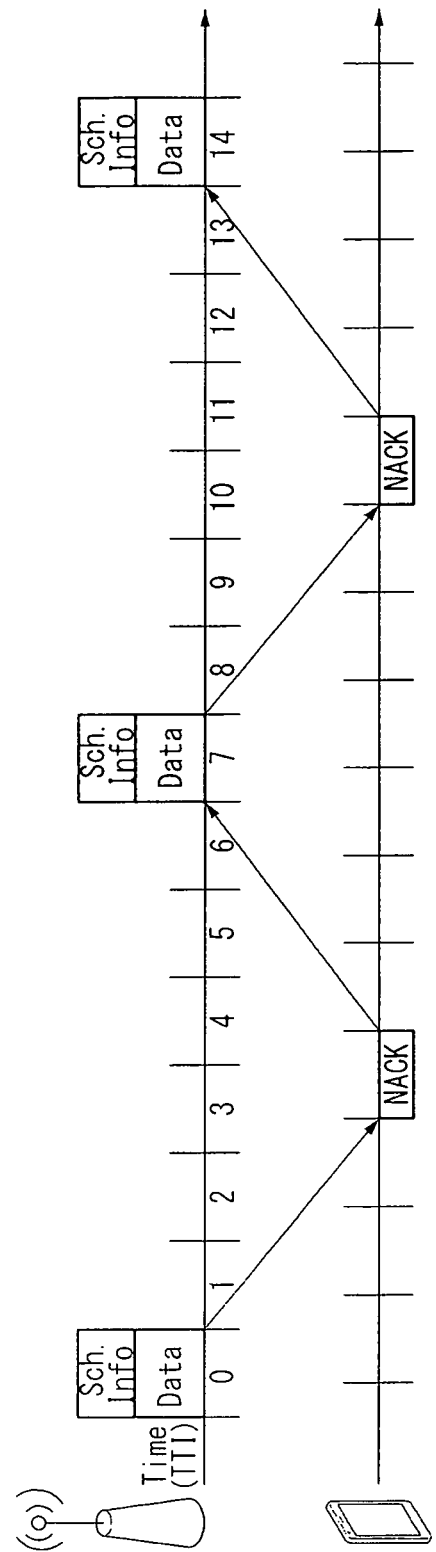
FIG. 16 is a diagram illustrating a resources allocation and retransmission process of an asynchronous HARQ method in a wireless communication system to which the present invention may be applied.

FIG. 16 is a diagram illustrating a resources allocation and retransmission process of an asynchronous HARQ method in a wireless communication system to which the present invention may be applied.

Meanwhile, for example, in the case of the downlink, after data is transmitted after scheduling, ACK/NACK information is received from a UE, and time delay is generated after next data is transmitted as in FIG. 16. The delay is delay generated due to channel propagation delay and the time taken for data decoding and data encoding.

For non-empty data transmission during such a delay interval, a transmission method using an independent HARQ process is used. For example, if the shortest period between next data transmission and next data transmission is 7 subframes, data transmission can be performed without an empty space if 7 independent processes are placed.

An LTE physical layer supports HARQ in a PDSCH and PUSCH and transmits associated reception ACK feedback in a separate control channel.

If the LTE FDD system does not operate in MIMO, 8 stop-and-wait (SAW) HARQ processes are supported both in the uplink and downlink as a constant round-trip time (RTT) of 8 ms.

CA-Based CoMP Operation

In the LTE-post system, cooperative multi-point (CoMP) transmission may be implemented using a carrier aggregation (CA) function in LTE.

FIG. 17 is a diagram illustrating a carrier aggregation-based CoMP system in a wireless communication system to which the present invention may be applied.

FIG. 17 illustrates a case where a primary cell (PCell) carrier and a secondary cell (SCell) carrier are allocated to two eNBs that use the same frequency band in a frequency axis and are geographically spaced apart, respectively.

Various DL/UL CoMP operations, such as JT, CS/CB, and dynamic cell selection, may be possible in such a manner that a serving eNB assigns the PCell to a UE1 and assign an SCell, to an adjacent eNB having great interference.

FIG. 17 illustrates an example in which a UE merges the two eNBs as a PCell and an SCell, respectively. However, one UE may merge 3 or more cells. Some of the cells may perform a CoMP operation in the same frequency band and other cells may perform a simple CA operation in another frequency band. In this case, the PCell does not need to necessarily participate in the CoMP operation.

UE Procedure for PDSCH Reception

When a UE detects the PDCCH of a serving cell in which a DCI format 1, 1A, 1B, 1C, 1D, 2, 2A, 2B or 2C intended therefor is delivered within a subframe other than a subframe(s) indicated by a high layer parameter "mbsfn-SubframeConfigList", it decodes a corresponding PDSCH in the same subframe due to a limit of the number of transport blocks defined in a high layer.

It is assumed that the UE decodes a PDSCH according to the detected PDCCH carrying the DCI format 1A or 1C intended therefor and having CRC scrambled by an SI-RNTI or P-RNTI and a PRS is not present in a resource block (RB) in which the corresponding PDSCH is delivered.

It is assumed that in the UE in which a carrier indication field (CIF) for a serving cell is configured, a carrier indication field is not present in any PDCCH of the serving cell within a common search space.

If not, it is assumed that when PDCCH CRC is scrambled by the C-RNTI or SPS C-RNTI, in a UE in which a CIF is configured, a CIF for the serving cell is present in a PDCCH located within a UE-specific search space.

When the UE is configured by a high layer so that it decodes a PDCCH having CRC scrambled by an SI-RNTI, the UE decodes the PDCCH and the corresponding PDSCH according to a combination defined in Table 7. The PDSCH corresponding to the PDCCH(s) is subjected to scrambling initialization by the SI-RNTI.

Table 7 illustrates the PDCCH and PDSCH configured by the SI-RNTI.

TABLE 7

| DCI format | Search space | PDSCH transmission method corresponding to a PDCCH |
|---|---|---|
| DCI format 1C | Common | If the number of PBCH antenna ports is 1, a single antenna port, a port 0 is used, and if not, transmit diversity |
| DCI format 1A | Common | If the number of PBCH antenna ports is 1, a single antenna port, a port 0 is used, and if not, transmit diversity |

If the UE is configured by a high layer so that it decodes a PDCCH having CRC scrambled by a P-RNTI, the UE decodes the PDCCH and a corresponding PDSCH according to a combination defined in Table 8. The PDSCH corresponding to the PDCCH(s) is subjected to scrambling initialization by the P-RNTI.

Table 8 illustrates the PDCCH and PDSCH configured by the P-RNTI.

TABLE 8

| DCI format | Search space | PDSCH transmission method corresponding to a PDCCH |
|---|---|---|
| DCI format 1C | Common | If the number of PBCH antenna ports is 1, a single antenna port, port 0 is used, and if not, transmit diversity |
| DCI format 1A | Common | If the number of PBCH antenna ports is 1, a single antenna port, port 0 is used, and if not, transmit diversity |

If the UE is configured by a high layer so that it decodes a PDCCH having CRC scrambled by an RA-RNTI, the UE decodes the PDCCH and a corresponding PDSCH according to a combination defined in Table 9. The PDSCH corresponding to the PDCCH(s) is subjected to scrambling initialization by the RA-RNTI.

Table 9 illustrates the PDCCH and PDSCH scrambled by the RA-RNTI.

TABLE 9

| DCI format | Search space | PDSCH transmission method corresponding to PDCCH |
|---|---|---|
| DCI format 1C | Common | If the number of PBCH antenna ports is 1, a single antenna port, port 0 is used, and if not, transmit diversity |
| DCI format 1A | Common | If the number of PBCH antenna ports is 1, a single antenna port, port 0 is used, and if not, transmit diversity |

The UE may be semi-statically configured through higher layer signaling so that it receives PDSCH data transmission signaled through a PDCCH according to one of nine transmission modes, such as a mode 1 to a mode 9.

In the case of a frame architecture type 1,

A UE does not receive a PDSCH RB transmitted in the antenna port 5 within any subframe in which the number of OFDM symbols for a PDCCH having a normal CP is 4.

If any one of 2 physical resource blocks (PRBs) to which a virtual resource block (VRB) pair is mapped overlaps a frequency in which a PBCH or a primary or secondary synchronization signal is transmitted within the same subframe, a UE does not receive a PDSCH RB transmitted in the antenna port 5, 7, 8, 9, 10, 11, 12, 13 or 14 in the corresponding 2 PRBs.

A UE does not receive a PDSCH RB transmitted in the antenna port 7 to which distributed VRB resource allocation has been assigned.

If a UE does not receive all of allocated PDSCH RBs, it may skip the decoding of a transport block. If the UE skip decoding, a physical layer indicates a high layer that a transport block has not been successfully.

In the case of a frame architecture type 2,

A UE does not receive a PDSCH RB transmitted in the antenna port 5 within any subframe in which the number of OFDM symbols for a PDCCH having a normal CP is 4.

If any one of two PRBs to which a VRB pair is mapped overlaps a frequency in which a PBCH is transmitted within the same subframe, a UE does not receive a PDSCH RB in the antenna port 5 transmitted in the corresponding two PRBs.

If any one of two PRBs to which a VRB pair is mapped overlaps a frequency in which a primary or secondary synchronization signal is transmitted in the same subframe, a UE does not receive a PDSCH RB transmitted in the antenna port 7, 8, 9, 10, 11, 12, 13 or 14 in the corresponding two PRBs.

I a normal CP is configured, a UE does not receive in the antenna port 5 PDSCH to which VRB resource allocation distributed within a special subframe has been assigned in an uplink-downlink configuration #1 or #6.

A UE does not receive a PDSCH in the antenna port 7 to which distributed VRB resource allocation has been assigned.

If a UE does not receive all of allocated PDSCH RB, it may skip the decoding of a transport block. If the UE skips decoding, a physical layer indicates a high layer that a transport block has not been successfully decoded.

If a UE is configured by a high layer so that it decodes a PDCCH having CRC scrambled by a C-RNTI, the UE decodes the PDCCH and a corresponding PDSCH according to each combination defined in Table 10. The PDSCH corresponding to the PDCCH(s) is subjected to scrambling initialization by the C-RNTI.

If a CIF for a serving cell is configured or a UE is configured by a high layer so that it decodes a PDCCH having CRC scrambled by a C-RNTI, the UE decodes the PDSCH of a serving cell indicated by a CIF value within a decoded PDCCH.

If a UE of the transmission mode 3, 4, 8 or 9 receives DCI format 1A assignment, the UE assumes that PDSCH transmission is related to a transport block 1 and a transport block 2 is disabled.

If a UE is configured in the transmission mode 7, a UE-specific reference signal corresponding to a PDCCH(s) is subjected to scrambling initialization by a C-RNTI.

If an extended CP is used in the downlink, a UE does not support the transmission mode 8.

If the transmission mode 9 is configured for a UE, when the UE detects a PDCCH carrying the DCI format 1A or 2C intended therefor and having CRC scrambled by a C-RNTI, the UE decodes a corresponding PDSCH in a subframe indicated by a high layer parameter ("mbsfn-SubframeConfigList"). However, the UE is configured by a high layer so that it decodes a PMCH, or a PRS occasion is configured only within an MBSFN subframe and a subframe in which a CP length used in a subframe #0 is a normal CP and a subframe used as part of a PRS occasion by a high layer is excluded.

Table 10 illustrates a PDCCH and PDSCH configured by a C-RNTI.

TABLE 10

| Transmission mode | DCI format | Search space | PDSCH transmission method corresponding to PDCCH |
|---|---|---|---|
| Mode 1 | DCI format 1A | Common and UE-specific by C-RNTI | Single antenna port, port 0 |
|  | DCI format 1 | UE-specific by C-RNTI | Single antenna port, port 0 |
| Mode 2 | DCI format 1A | Common and UE-specific by C-RNTI | Transmit diversity |
|  | DCI format 1 | UE-specific by C-RNTI | Transmit diversity |
| Mode 3 | DCI format 1A | Common and UE-specific by C-RNTI | Transmit diversity |
|  | DCI format 2A | UE-specific by C-RNTI | Large delay CDD or transmit diversity |
| Mode 4 | DCI format 1A | Common and UE-specific by C-RNTI | Transmit diversity |
|  | DCI format 2 | UE-specific by C-RNTI | Closed-loop spatial multiplexing or transmit diversity |
| Mode 5 | DCI format 1A | Common and UE-specific by C-RNTI | Transmit diversity |
|  | DCI format 1D | UE-specific by C-RNTI | Multi-user MIMO |
| Mode 6 | DCI format 1A | Common and UE-specific by C-RNTI | Transmit diversity |
|  | DCI format 1B | UE-specific by C-RNTI | Closed-loop spatial multiplexing using single transport layer |
| Mode 7 | DCI format 1A | Common and UE-specific by C-RNTI | If the number of PBCH antenna ports is 1, a single antenna port, port 0 is used, and if not, transmit diversity |
|  | DCI format 1 | UE-specific by C-RNTI | Single antenna port, port 5 |
| Mode 8 | DCI format 1A | Common and UE-specific by C-RNTI | If the number of PBCH antenna ports is 1, a single antenna port, port 0 is used, and if not, transmit diversity |
|  | DCI format 2B | UE-specific by C-RNTI | Dual layer transmission, ports 7 and 8 or a single antenna port, port 7 or 8 |
| Mode 9 | DCI format 1A | Common and UE-specific by C-RNTI | Non-MBSFN subframe: if the number of PBCH antenna ports is 1, a single antenna port, port 0 is used, and if not, transmit diversity MBSFN subframe: a single antenna port, port 7 |
|  | DCI format 2C | UE-specific by C-RNTI | Layer transmission of maximum 8, port 7-14 |

If a UE is configured by a high layer so that it decodes a PDCCH having SPS CRC scrambled by a C-RNTI, the UE decodes the PDCCH of a primary cell and the corresponding PDSCH of the primary cell according to each combination defined in Table 11. If the PDSCH is transmitted without the corresponding PDCCH, the same PDSCH-related configuration is applied. A PDSCH corresponding to the PDCCH and a PDSCH not having a PDCCH are subjected to scrambling initialization by an SPS C-RNTI.

If the transmission mode 7 is configured for a UE, a UE-specific reference signal corresponding to a PDCCH(s) is subjected to scrambling initialization by an SPS C-RNTI.

If the transmission mode 9 is configured for a UE, when the UE detects a PDCCH carrying the DCI format 1A or 2C intended therefor and having SPS CRC scrambled by a C-RNTI or a configured PDSCH configured without a PDCCH intended therefor, the UE decodes the corresponding PDSCH in a subframe indicated by a high layer parameter ("mbsfn-SubframeConfigList"). In this case, the UE is configured by a high layer so that it decodes a PMCH, or a PRS occasion is configured only within an MBSFN subframe, and a subframe in which a CP length used in a subframe #0 is a normal CP and configured as part of a PRS occasion by a high layer is excluded.

Table 11 illustrates a PDCCH and PDSCH configured by an SPS C-RNTI.

TABLE 11

| Transmission mode | DCI format | Search space | PDSCH transmission method corresponding to PDCCH |
|---|---|---|---|
| Mode 1 | DCI format 1A | Common and UE-specific by C-RNTI | Single antenna port, port 0 |
|  | DCI format 1 | UE-specific by C-RNTI | Single antenna port, port 0 |
| Mode 2 | DCI format 1A | Common and UE-specific by C-RNTI | Transmit diversity |
|  | DCI format 1 | UE-specific by C-RNTI | Transmit diversity |
| Mode 3 | DCI format 1A | Common and UE-specific by C-RNTI | Transmit diversity |
|  | DCI format 2A | UE-specific by C-RNTI | Transmit diversity |
| Mode 4 | DCI format 1A | Common and UE-specific by C-RNTI | Transmit diversity |
|  | DCI format 2 | UE-specific by C-RNTI | Transmit diversity |
| Mode 5 | DCI format 1A | Common and UE-specific by C-RNTI | Transmit diversity |
| Mode 6 | DCI format 1A | Common and UE-specific by C-RNTI | Transmit diversity |
| Mode 7 | DCI format 1A | Common and UE-specific by C-RNTI | Single antenna port, port 5 |
|  | DCI format 1 | UE-specific by C-RNTI | Single antenna port, port 5 |
| Mode 8 | DCI format 1A | Common and UE-specific by C-RNTI | Single antenna port, port 7 |
|  | DCI format 2B | UE-specific by C-RNTI | Single antenna port, port 7 or 8 |
| Mode 9 | DCI format 1A | Common and UE-specific by C-RNTI | Single antenna port, port 7 |
|  | DCI format 2C | UE-specific by C-RNTI | Single antenna port, port 7 or 8 |

If a UE is configured by a high layer so that it decodes a PDCCH having CRC scrambled by a temporary C-RNTI and is configured so that it does not decode a PDCCH having CRC scrambled by the C-RNTI, the UE decodes the PDCCH and a corresponding PDSCH according to a combination defined in Table 12. The PDSCH corresponding to the PDCCH(s) is subjected to scrambling initialization by the temporary C-RNTI.

Table 12 illustrates the PDCCH and PDSCH configured by a temporary C-RNTI.

TABLE 12

| DCI format | Search space | PDSCH transmission method corresponding to PDCCH |
|---|---|---|
| DCI format 1A | Common and UE-specific by temporary C-RNTI | If the number of PBCH antenna ports is 1, a singleantenna port, port 0 is used, and if not, transmit diversity |
| DCI format 1 | UE-specific by temporary C-RNTI | If the number of PBCH antenna ports is 1, a single antenna port, port 0 is used, and if not, transmit diversity |

UE Procedure for PUSCH Transmission

A UE is semi-statically configured through higher layer signaling so that it performs PUSCH transmission signaled through a PDCCH according to any one of two uplink transmission modes of the mode 1 and 2 defined in Table 13. When the UE is configured by a high layer so that it decodes a PDCCH having CRC scrambled by a C-RNTI, the UE decodes the PDCCH according to a combination defined in Table 13 and transmits the corresponding PUSCH. PUSCH transmission corresponding to the PDCCH(s) and PUSCH retransmission for the same transport block are subjected to scrambling initialization by the C-RNTI. The transmission mode 1 is a default uplink transmission mode for the UE until the uplink transmission mode is assigned to the UE by higher layer signaling.

If the transmission mode 2 is configured for a UE and the UE receives a DCI format 0 uplink scheduling grant, the UE assumes that PUSCH transmission is related to a transport block 1 and a transport block 2 is disabled.

Table 13 illustrates the PDCCH and PUSCH configured by the C-RNTI.

TABLE 13

| Transmission mode | DCI format | Search space | Transmission method of PUSCH corresponding to PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |
|  | DCI format 4 | UE-specific by C-RNTI | Closed-loop spatial multiplexing |

If a UE is configured by a high layer so that it decodes a PDCCH having CRC scrambled by a C-RNTI and receives a random access procedure initiated by a PDCCH order, the UE decodes the PDCCH according to a combination defined in Table 14.

Table 14 illustrates the PDCCH configured by a PDCCH order for initiating a random access procedure.

TABLE 14

| DCI format | Search space |
|---|---|
| DCI format 1A | Common and UE-specific by C-RNTI |

If a UE is configured by a high layer so that it decodes a PDCCH having SPS CRC scrambled by a C-RNTI, the UE decodes the PDCCH according to a combination defined in Table 15 and transmits a corresponding PUSCH. PUSCH transmission corresponding to the PDCCH(s) and PUSCH retransmission for the same transport block are subjected to scrambling initialization by the SPS C-RNTI. Minimum transmission of the PUSCH and PUSCH retransmission for the same transport block without the corresponding PDCCH is subjected to scrambling initialization by the SPS C-RNTI.

Table 15 illustrates the PDCCH and PUSCH configured by the SPS C-RNTI.

TABLE 15

| Transmission mode | DCI format | Search space | Transmission method of PUSCH corresponding to PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |

Regardless of whether a UE has been configured to decode a PDCCH having CRC scrambled by a C-RNTI, if the UE is configured by a high layer so that it decodes a PDCCH scrambled by a temporary C-RNTI, the UE decodes the PDCCH according to a combination defined in Table 16 and transmits the corresponding PUSCH. A PUSCH corresponding to the PDCCH(s) is subjected to scrambling initialization by the temporary C-RNTI.

If the temporary C-RNTI is set by a high layer, PUSCH transmission corresponding to a random access response grant and PUSCH retransmission for the same transport block are scrambled by the temporary C-RNTI. If not, PUSCH transmission corresponding to a random access response grant and PUSCH retransmission for the same transport block are scrambled by a C-RNTI.

Table 16 illustrates the PDCCH configured by the temporary C-RNTI.

TABLE 16

| DCI format | Search space |
|---|---|
| DCI format 0 | Common |

If a UE is configured by a high layer so that it decodes a PDCCH having CRC scrambled by a TPC-PUCCH-RNTI, the UE decodes the PDCCH according to a combination defined in Table 17. The indication of 3/3A in Table 17 includes that the UE receives the DCI format 3 or DCI format according to the configuration.

Table 17 illustrates the PDCCH configured by the TPC-PUCCH-RNTI.

TABLE 17

| DCI format | Search space |
|---|---|
| DCI format 3/3A | Common |

If a UE is configured by a high layer so that it decodes a PDCCH having CRS scrambled by a TPC-PUSCH-RNTI, the UE decodes the PDCCH according to a combination defined in Table 18. The indication of 3/3A in Table 18 includes that the UE receives the DCI format 3 or DCI format according to the configuration.

Table 18 illustrates the PDCCH configured by the TPC-PUSCH-RNTI.

TABLE 18

| DCI format | Search space |
|---|---|
| DCI format 3/3A | Common |

Relay Node (RN)

A relay node delivers data transmitted/received between an eNB and a UE through two different links (backhaul link and access link). The eNB may include a donor cell. The relay node is wirelessly connected to a wireless access network through the donor cell.

Meanwhile, in relation to the band (or spectrum) use of a relay node, a case where a backhaul link operates in the same frequency band as an access link and is called an "in-band", and a case where the backhaul link and the access link operate in different frequency bands is called an "out-band." In both the in-band and the out-band, a UE operating according to the existing LTE system (e.g., Release-8) (hereinafter referred to as a "legacy UE") is capable of accessing a donor cell.

A relay node may be divided into a transparent relay node or a non-transparent relay node depending on whether a UE recognizes the relay node. Transparent means a case where whether a UE communicates with a network through a relay node is not recognized. Non-transparent means a case where whether a UE communicates with a network through a relay node is recognized.

In relation to control of a relay node, the relay node may be divided into a relay node configured as part of a donor cell and a relay node that autonomously controls a cell.

A relay node configured as part of a donor cell may have a relay node identifier (relay ID), but does not have the cell identity of the relay node itself.

If at least part of radio resource management (RRM) is controlled by an eNB to which a donor cell belongs, although the remaining parts of the RRM are located in a relay node, it is called a relay node configured as part of the donor cell. Preferably, such a relay node may support a legacy UE. For example, various types of smart repeaters, decode-and-forward relays, and L2 (second layer) relay nodes and a type-2 relay node correspond to such a relay node.

In the case of a relay node that autonomously controls a cell, the relay node controls one cell or a plurality of cells, and a unique physical layer cell identity is provided to each of cells controlled by the relay node. Furthermore, the cells controlled by the relay node may use the same RRM mechanism. From a viewpoint of a UE, there is no difference between a case where a UE accesses a cell controlled by a relay node and a UE accesses a cell controlled by a common eNB. A cell controlled by such a relay node may support a legacy UE. For example, a self-backhauling relay node, an L3 (third layer) relay node, a type-1 relay node and a type-1a relay node correspond to such a relay node.

A type-1 relay node is an in-band relay node and controls a plurality of cells. Each of the plurality of cells seems to be a separate cell different from a donor cell from a viewpoint of a UE. Furthermore, a plurality of cells has respective physical cell IDs (this is defined in LTE Release-8), and the relay node may transmit its own synchronization channel, a reference signal, etc. In the case of a single-cell operation, a UE may directly receive scheduling information and HARQ feedback from a relay node and transmit its own control channel (scheduling request (SR), CQI, ACK/NACK, etc.) to a relay node. Furthermore, the type-1 relay node seems to be a legacy eNB (an eNB operating according to the LTE Release-8 system) from a viewpoint of legacy UEs (UEs operating according to the LTE Release-8 system). That is, the type-1 relay node has (backward compatibility. Meanwhile, from a viewpoint of UEs operating according to the LTE-A systems, the type-1 relay node seems to be an eNB different from a legacy eNB, and can provide performance improvement.

In addition to a case where the type-1a relay node operates in an out-band, it has the same characteristics as the type-1 relay node. The operation of the type-1a relay node may be configured so that an influence attributable to an L1 (first layer) operation is minimized or not present.

A type-2 relay node is an in-band relay node and does not have a separate physical cell ID and thus does not form a new cell. The type-2 relay node is transparent to a legacy UE, and the legacy UE does not recognize the presence of the type-2 relay node. The type-2 relay node may transmit a PDSCH, but does not transmit a CRS and PDCCH at least.

Meanwhile, in order for a relay node to operate in the in-band, some resources in the time-frequency space must be reserved for a backhaul link, and the resources may be configured so that they are not used for an access link. This is called resources partitioning.

A common principle in resources partitioning in a relay node may be described as follows. Backhaul downlink and access downlink may be multiplexed on one carrier frequency according to a time division multiplexing (TDM) method (i.e., only one of the backhaul downlink and access downlink is activated in a specific time). Similarly, the backhaul uplink and access uplink may be multiplexed on one carrier frequency according to the TDM scheme (i.e., only one of the backhaul uplink and access uplink is activated in a specific time).

In the backhaul link multiplexing in FDD, backhaul downlink transmission may be performed in a downlink frequency band, and backhaul uplink transmission may be performed in an uplink frequency band. In the backhaul link multiplexing in TDD, backhaul downlink transmission may be performed in a downlink subframe of an eNB and a relay node, and backhaul uplink transmission may be performed in an uplink subframe of an eNB and a relay node.

In the case of an in-band relay node, for example, if backhaul downlink reception from an eNB and access downlink transmission to a UE are performed in the same frequency band at the same time, signal interference may be generated from the reception stage of the relay node due to a signal transmitted by the transmission stage of the relay node. That is, signal interference or RF jamming may be generated from the RF front end of the relay node. Likewise, if backhaul uplink transmission to an eNB and access uplink reception from a UE are performed in the same frequency band at the same time, signal interference may be generated.

Accordingly, in order for a relay node to transmit/receive signals in the same frequency band at the same time, it is difficult to implement the simultaneous transmission if sufficient separation between a reception signal and a transmission signal (e.g., a transmit antenna and a receive antenna are sufficiently isolated geographically, such as that the transmit antenna and the receive antenna are installed on the ground/underground).

One scheme for solving such a signal interference problem is that a relay node operates to not send a signal to a UE while it receives a signal from a donor cell. That is, a gap is generated in transmission from the relay node to the UE. During the gap, the UE (including a legacy UE) may be configured to not expect any transmission from the relay node. Such a gap may be configured by configuring a multicast broadcast single frequency network (MBSFN) subframe.

FIG. 18 illustrates a structure of relay resource partitioning in the wireless communication system to which the present invention can be applied.

In FIG. 18, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subframe may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Quasi Co-Located (QCL) between Antenna Ports

Quasi co-located or quasi co-location (QC/QCL) may be defined as follows.

If two antenna ports are in a QC/QCL relation (or subjected to QC/QCL), a UE may assume that the large-scale property of a signal delivered through one antenna port may be inferred from a signal delivered through another antenna port. In this case, the large-scale property include one or more of delay spread, Doppler spread, a frequency shift, average received power and received timing.

Furthermore, the large-scale property may be defined as follows. If two antenna ports are in a QC/QCL relation (or subjected to QC/QCL), a UE may assume that the large-scale property of a channel through which one symbol is delivered through one antenna port may be inferred from a radio channel through which one symbol is delivered through another antenna port. In this case, the large-scale property include one or more of delay spread, Doppler spread, Doppler shift, an average gain and average delay.

That is, if two antenna ports are in a QC/QCL relation (or subjected to QC/QCL), this means that the large-scale property of a radio channel from one antenna port is the same as the large-scale property of a radio channel from the remaining one antenna port. If a plurality of antenna ports in which an RS is transmitted is taken into consideration, when antenna ports in which different two types of RSs are transmitted have a QCL relation, the large-scale property of a radio channel from one antenna port may be substituted with the large-scale property of a radio channel from the other antenna port.

In this specification, the above QC/QCL-related definitions are not distinguished. That is, the QC/QCL concept may comply with one of the definitions. Or, in a similar form, the QC/QCL concept definition may be modified into a form in which transmission may be assumed between antenna ports having a QC/QCL assumption as if it is performed in the co-location (e.g., a UE may assume antenna ports transmitted at the same transmission point). The spirit of the present invention includes such similar modified examples. In the present invention, for convenience of description, the above QC/QCL-related definitions are interchangeably used.

According to the QC/QCL concept, a UE cannot assume the same large-scale property between radio channels from corresponding antenna ports with respect to non-QC/QCL antenna ports. That is, in this case, the UE must perform independent processing on each non-QC/QCL antenna port configured with respect to timing acquisition and tracking, frequency offset estimation and compensation, delay estimation and Doppler estimation.

There is an advantage in that a UE can perform the following operation between antenna ports capable of assuming QC/QCL:

With respect to delay spread and Doppler spread, the UE may apply a power-delay profile, delay spread, a Doppler spectrum, Doppler spread estimation results for a radio channel from any one antenna port to a Wiener filter used upon channel estimation for a radio channel from another antenna port in the same manner.

With respect to frequency shift and received timing, the UE may apply the same synchronization to the demodulation of another antenna port after performing time and frequency synchronization on any one antenna port.

With respect to average received power, the UE may average reference signal received power (RSRP) measurement for two or more antenna ports.

For example, if DMRS antenna ports for downlink data channel demodulation have been subjected to QC/QCL with the CRS antenna port of a serving cell, the UE can improve DMRS-based downlink data channel reception performance by likewise applying the large-scale property of a radio channel estimated from its own CRS antenna port upon channel estimation through a corresponding DMRS antenna port.

The reason for this is that an estimate regarding the large-scale property can be more stably obtained from a CRS because the CRS is a reference signal broadcasted with relatively high density every subframe and over a full band. In contrast, a DMRS is transmitted in a UE-specific manner with respect to a specific scheduled RB. Furthermore, the precoding matrix of a precoding resource block group (PRG) unit used by an eNB for transmission may be changed, and thus a valid channel received by a UE may vary in a PRG unit. Although a plurality of PRGs has been scheduled, performance deterioration may occur if the DMRS is used to estimate the large-scale property of a radio channel in a wide band. Furthermore, since a CSI-RS may have a transmission period of several~several tens of ms and a resource block has low density of 1 resource element per antenna port on average, performance deterioration may occur if the CSI-RS is used to estimate the large-scale property of a radio channel.

That is, a UE can use it for the detection/reception of a downlink reference signal, channel estimation and a channel state report by QC/QCL assumption between antenna ports.

Device-to-Device (D2D) Communication

Figure 19:
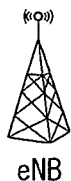
FIG. 19 is a diagram for illustrating the elements of a direct communication (D2D) scheme between UEs.

FIG. 19 is a diagram for illustrating the elements of a direct communication (D2D) scheme between UEs.

In FIG. 19, a UE means the UE of a user, and corresponding network equipment may also be taken into consideration to be a kind of UE if the network equipment, such as an eNB, transmits/receives a signal according to a communication method with the UE. Hereinafter, a UE1 may operate to select a resource unit corresponding to specific resources within a resource pool that means a set of a series of resources and to transmit a D2D signal using the corresponding resource unit. A UE2, that is, a reception UE for the UE1, receives a configuration for the resource pool in which the UE1 may send a signal, and detects the signal of the UE1 within the corresponding pool. In this case, an eNB may notify the UE1 of the resource pool if the UE 1 is located within the connection range of the eNB. If the UE1 is out of the connection range of the eNB, another UE may notify the UE1 of the resource pool or the resource pool may be previously determined to be predetermined resources. In general, the resource pool may include a plurality of resource units, and each UE may select one or a plurality of resource units and use it for its own D2D signal transmission.

Figure 20:
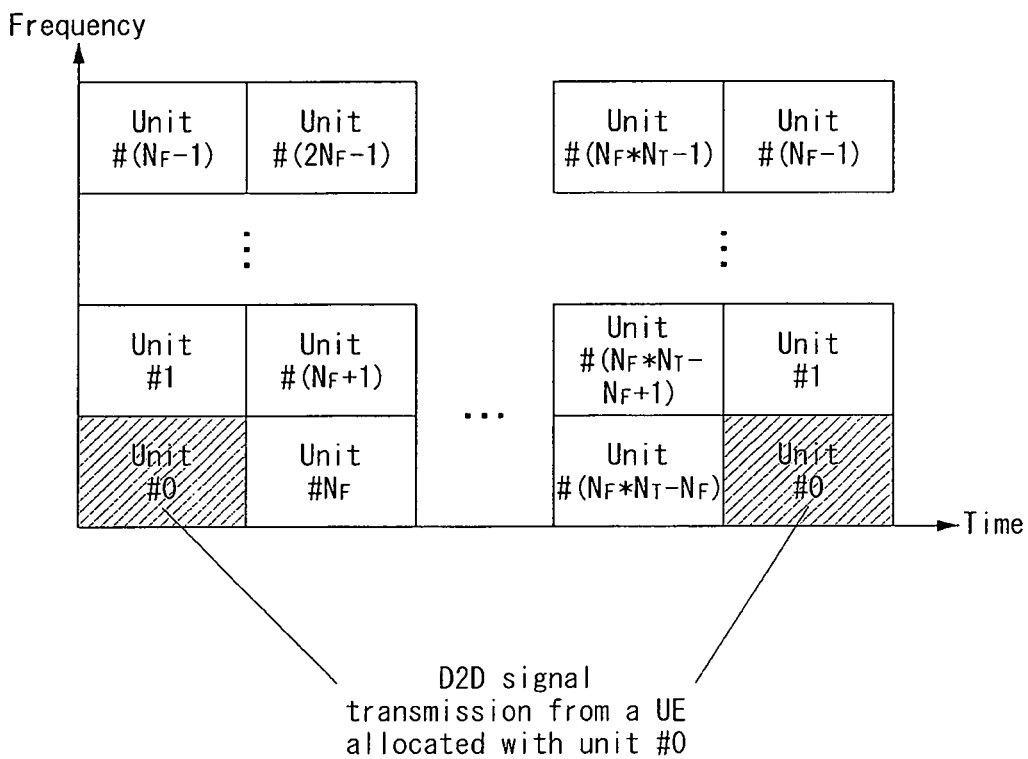
FIG. 20 is a diagram illustrateing an embodiment of the configuration of a resource unit.

FIG. 20 is a diagram illustrateing an embodiment of the configuration of a resource unit.

Referring to FIG. 20, all of frequency resources have been partitioned into N_F, all of time resources have been partitioned into N_T, and thus a total of N_F*N_T resource units may be defined. In this case, it may be expressed that a corresponding resource pool is repeated using an N_T subframe as a cycle. Characteristically, as illustrated in this drawing, one resource unit may periodically repeatedly appear. Or in order to obtain a diversity in a time or frequency dimension, the index of a physical resource unit to which one logical resource unit is mapped may change in a predetermined pattern over time. In such a resource unit structure, the resource pool may mean a set of resource units that a UE trying to send a D2D signal may use for transmission.

The aforementioned resource pool may be subdivided into several types. First, the resource pool may be divided depending on the contents of a D2D signal transmitted in each resource pool. For example, the contents of a D2D signal may be divided as follows, and a separate resource pool may be configured in each of the contents.

Scheduling assignment (SA): a signal including the location of resources used as the transmission of a D2D data channel used by each transmission UE, a modulation and coding scheme (MCS) necessary for the demodulation of other data channels or information, such as an MIMO transmission method and/or timing advance. The signal may be multiplexed with D2D data on the same resource unit and transmitted. In this specification, an SA resource pool may mean a pool of resources in which SA is multiplexed with D2D data and transmitted, and may also be called a D20 control channel.

A D2D data channel: a resource pool used for a transmission UE to send user data using resources designated through SA. If the resource pool may be multiplexed with D2D data on the same resource unit and transmitted, only a D2D data channel of a form other than SA information may be transmitted in a resource pool for a D2D data channel. In other words, a resource element used to transmit SA information on an individual resource unit within an SA resource pool may still be used to send D2D data in a D2D data channel resource pool.

A discovery channel: a resource pool for a message that enables a transmission UE transmits information, such as its own ID, so that an adjacent UE can discover the transmission UE.

In contrast, if the contents of a D2D signal are the same, a different resource pool may be used depending on the transmission/reception attributes of the D2D signal. For example, even in the case of the same D2D data channel or discovery message, it may be classified as a different resource pool depending on a transmission timing determination method of a D2D signal (e.g., whether the D2D signal is transmitted in the reception occasion of a synchronization reference signal or it is transmitted by applying a specific timing advance in a corresponding occasion) or a resource allocation method (e.g., whether an eNB designates the transmission resources of an individual signal for an individual transmission UE or an individual transmission UE autonomously selects individual signal transmission resources within each pool), a signal format (e.g., the number of symbols that each D2D signal occupies within one subframe or the number of subframes used for the transmission of one D2D signal), signal intensity from an eNB, and transmit power intensity of a D2D UE.

Figure 21:
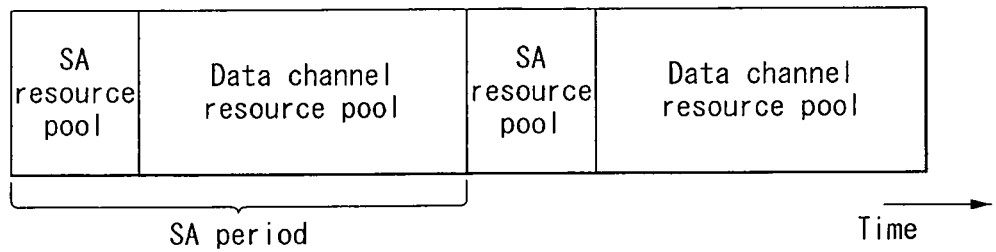
FIG. 21 illustrates a case where an SA resource pool and a following data channel resource pool periodically appear.

FIG. 21 illustrates a case where an SA resource pool and a following data channel resource pool periodically appear. Hereinafter, the period in which an SA resource pool appears is called an SA period.

The present invention provides a method of selecting resources for transmitting a relay signal when a relay operation is performed in D2D communication.

In this specification, for convenience of description, a method for an eNB to directly indicate the transmission resources of a D2D transmission UE in D2D communication is called/defined as Mode 1, and a method in which a transmission resource region has been previously configured or a method for an eNB to designate a transmission resource region and for a UE to directly select transmission resources is called/defined as Mode 2. In the case of D2D discovery, a case where an eNB directly indicates resources is called/defined as Type 2, and a case where a UE directly selects transmission resources in a previously configured resource region or in a resource region indicated by an eNB is called/defined as Type 1.

The aforementioned D2D may also be called a sidelink. SA may be called a physical sidelink control channel (PSCCH), and a D2D synchronization signal is called a sidelink synchronization signal (SSS), and a control channel through which the most basic information is transmitted prior to ≡ D2D communication transmitted along with the SSS may be called a physical sidelink broadcast channel (PSBCH) or a physical D2D synchronization channel (PD2DSCH) as another name. A signal used for a specific UE to provide notification that it is located nearby, in this case, the signal may include the ID of the specific UE. Such a channel may be called a physical sidelink discovery channel (PSDCH).

In D2D of Rel. 12, only a D2D communication UE has transmitted a PSBCH along with an SSS. Accordingly, the measurement of an SSS is performed using the DMRS of a PSBCH. An out-coverage UE measures the DMRS of a PSBCH, measures the reference signal received power (RSRP) of the signal, and determines whether it will become its synchronization source.

Figure 22:
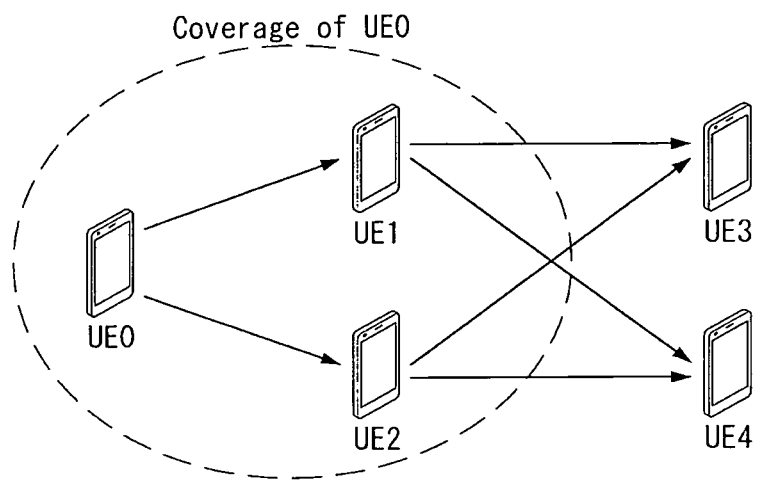
Figure 23:
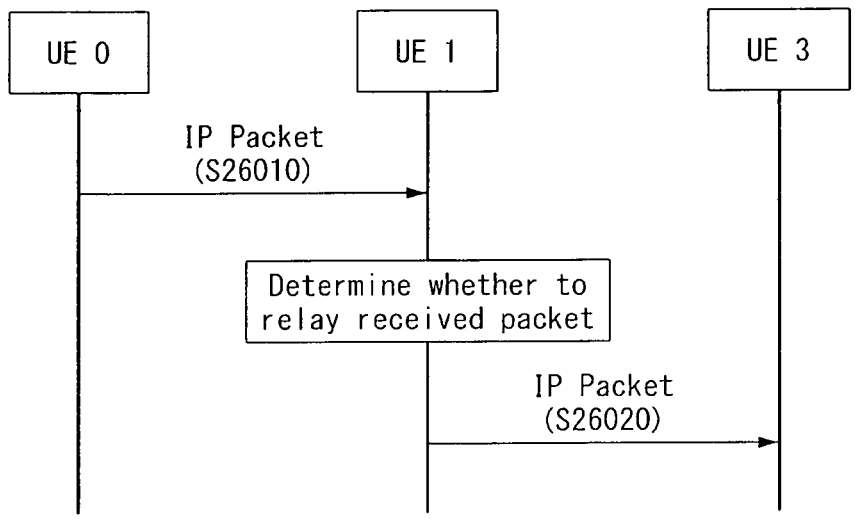

FIGS. 22 to 24 are diagrams illustrating an example of a relay process and a resource for relay according to an exemplary embodiment of the present invention.

Referring to FIGS. 22 to 24, in a communication system that supports device-to-device communication, by transmitting data to a terminal outside coverage through relay, the terminal may substantially extend coverage.

Specifically, as illustrated in FIG. 22, a UE 1 and/or a UE 2, which are UEs within coverage of a UE 0 may receive a message transmitted by the UE 0.

However, the UE 0 cannot directly transmit a message to a UE 3 and a UE 4 existing outside coverage. Therefore, in such a case, in order to transmit a message to the UE 3 and the UE 4 outside coverage of the UE 0, the UE 0 may perform a relay operation.

In order to transmit a message to the terminal existing outside coverage, the relay operation means an operation in which terminals within coverage transfer a message.

FIG. 23 illustrates an example of the relay operation, and when the UE 0 transmits a data packet to the UE 3 outside coverage, the UE 0 may transmit the data packet to the UE 3 through the UE 1.

Specifically, when the UE 0 transmits the data packet to the UE 3, the UE 0 sets a parameter representing whether the data packet may be relayed to execution of a relay operation and transmits the data packet (S26010).

The UE 1 receives the data packet and determines whether to relay the data packet is through the parameter.

When the parameter instructs a relay operation, the UE 1 transmits the received data packet to the UE 3, and when the parameter does not instruct a relay operation, the UE 1 does not transmit the data packet to the UE 3.

The UE 0 may transmit a message to the terminal existing outside coverage through such a method.

FIG. 24 illustrates an example of a method of selecting a resource for a relay operation.

Referring to FIG. 24(a), the terminal may autonomously select a resource in a resource pool to relay a message. That is, UEs (UE 1, UE 2, and UE 3) that relay the same message may randomly select a resource in a resource pool to relay the same message.

However, in such a case, there is a problem that a receiving terminal that receives a message repeatedly receives the same message through different resources.

Therefore, as illustrated in FIG. 24(b), in a resource pool, a resource for relay is allocated, and when each relay terminal transmits a message through an allocated resource, the receiving terminal may receive the same message through the same resource, thereby reducing resource waste.

The present invention proposes a method for performing communication between user equipments (UEs) in a wireless communication system.

In particular, in the present invention, a wireless communication environment in which communication between vehicles (vehicle-to-everything (V2X)) is performed using a radio channel is taken into consideration. V2X includes communication between a vehicle and all of entities, such as vehicle-to-everything (V2X) denoting communication between vehicles, vehicle to infrastructure (V2I) denoting communication between a vehicle and an eNB or a road side unit (RSU), vehicle-to-pedestrian (V2P) denoting communication between a vehicle and a UE held by a person (pedestrian, bicycle driver, vehicle driver or passenger).

More specifically, the present invention (or specification) proposes a method of preventing redundant information from being meaninglessly transmitted if network entities support the communication between the UEs.

In this case, the network entity may mean a base station (eNB), a road side unit (RSU), a UE or an application server (e.g., traffic safety server).

Hereinafter, in the description of the present invention, a UE may mean a UE (i.e., vehicle) performing V2X (vehicle UE (V-UE)), a pedestrian UE, the RSU of an eNB type or the RSU of a UE type in addition to a common UE.

Furthermore, the network entity(s) may collect information of UEs related thereto and transmit the collected information to (the or different) UEs related thereto.

For example, a first UE may collect (or receive) information from a plurality of second UEs related thereto and broadcast the collected information to at least one third UE.

Figure 25:
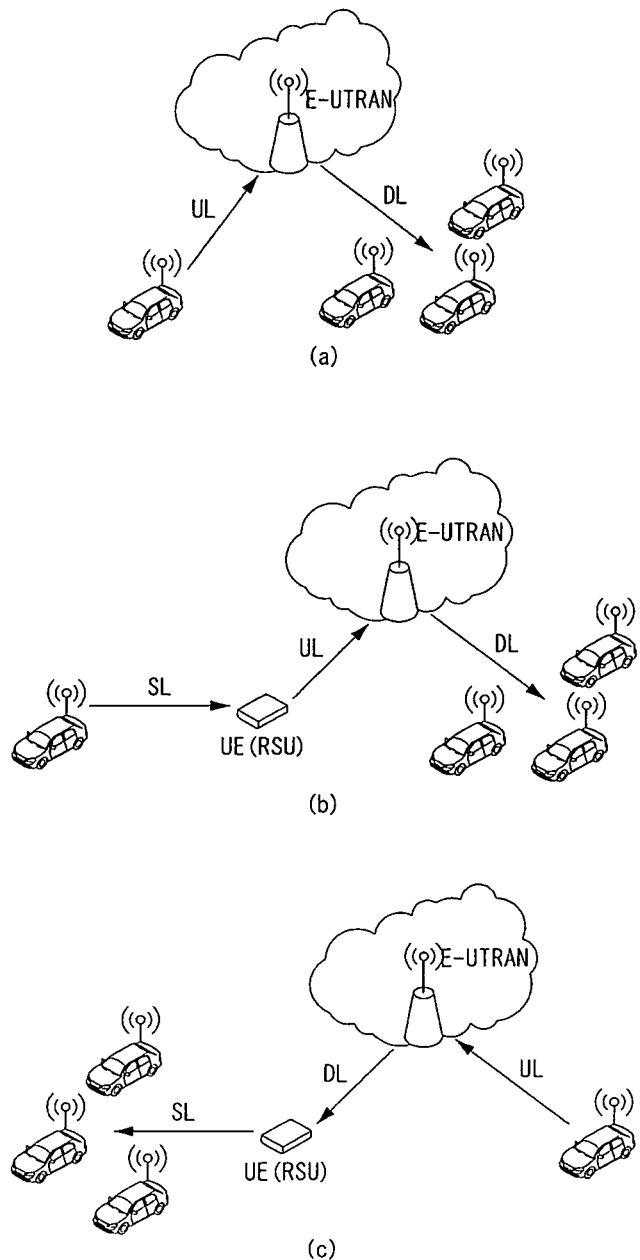
FIG. 25 illustrates modes of a vehicle-to-everything (V2X) operation to which the present invention may be applied.

The communication method between UEs may be expressed like FIG. 25.

Operation Modes Supported by V2X System

FIG. 25 illustrates modes of a vehicle-to-everything (V2X) operation to which the present invention may be applied. FIG. 25 is only for convenience of description, and does not limit the scope of the present invention.

FIG. 25(a) illustrates a mode in which a UE(s) transmits a message (e.g., V2X message) to a specific network entity (e.g., eNB, E-UTRAN) (uplink transmission) and the specific network entity transmits the received information to a plurality of UEs in a specific region downlink transmission).

In this specification, a V2X message means messages exchanged between a network entity and a UE using a V2X communication system.

In this case, the specific network entity may be a base station eNB, an E-UTRAN or the RSU of an eNB type.

Furthermore, the UE may communicate with an application server.

FIGS. 25(b) and 25(c) illustrate modes in which an RSU (e.g., the RSU of a UE type) is present between UEs and a specific network entity and the RSU receives a message from the UEs or transmits a message to the UEs.

In this case, it is assumed that the RSU is connected to a specific network entity.

The specific network entity may receive a message from the UEs or transmit a message to the UEs using the RSU. In this case, the specific network entity may be an eNB, an E-UTRAN, or the RSU of an eNB type.

In this case, the specific network entity (e.g., eNB) or RSU that receives the message of the UEs may operate through a Uu interface (e.g., Uu vehicle-to-infrastructure (V2I)) using a legacy LTE uplink method.

Alternatively, the specific network entity (e.g., eNB) or RSU may operate through a PC5 interface (e.g., PC5 V2I or PC5 V2V signal overhearing) using a separate resource or separate band for supporting communication between UEs.

Likewise, a specific network entity (e.g., eNB) or RSU that transmits a message to UEs may operate through a Uu interface or PC5 interface using a legacy LTE downlink method.

In the aforementioned communication between UEs, a message for the safety operation of a UE may be defined.

For example, in communication between vehicles, a message (e.g., basic safety message (BSM)) for assisting safe vehicle operation may be defined.

In this case, the message may include basic information for a vehicle operation, such as a vehicle, a traffic situation around the vehicle or a communication situation of the vehicle.

Furthermore, the message may further include an identifier (e.g., ID) capable of identifying a vehicle itself, information (e.g., GPS information, 2 dimension (2D)/3D information of a vehicle location) indicating the location of the vehicle, information (e.g., the velocity/acceleration of the vehicle, the progress direction of the vehicle, a steering angle) related to the mobility of the vehicle, and so on.

If each UE directly transmits and receives the aforementioned message to and from a UE (i.e., if each UE transmits and receives the messages using a PC5 V2V method), the message may have to be transmitted without any change without separate processing.

In particular, unlike in the methods illustrated in FIG. 25, if a network entity capable of obtaining (some of or the entire) information about a transmitter UE is not present between the corresponding transmitter UE(s) and/or a receiver UE(s) (e.g., out of network of D2D communication), the message may need to be transmitted without being processed.

In other words, a transmitter UE needs to transmit a message more accurately and stably because a receiver UE depends on only a message and information received from the transmitter UE.

In contrast, if the message transmission of a UE is supported by a network entity as in FIG. 25, a method (e.g., multicast/broadcast method) for at least one network entity to receive a message (e.g., V2X message, BSM) from one or more UEs and to transmit the received message to one or more UEs may be used.

In this case, the message may include fields indicating a UE ID, the ID (e.g., cell ID) of a network to which a vehicle belongs, a message ID, the location of the UE, the mobility of the UE, and the contents of the message.

In this case, fields related to ID (e.g., UE ID, cell ID, message ID) independently assigned to each UE may include bits not having association between UEs.

In contrast, some degree of association may be present between the fields related to the location of a UE or the mobility of the UE. In particular, close association may be present between the locations of UEs within coverage of a specific network entity.

In this case, significant overhead may occur if a specific network entity transmits one or more messages received from one or more UEs to UEs without any change, that is, without taking into consideration a redundant part between the messages.

Setting of Location Information of UE

Information (or location information) indicating the location of a UE may be determined on an actual cartesian coordinate system based on GPS information.

FIG. 26 illustrates the configuration of location information of a UE to which the present invention may be applied.

FIG. 26 is only for convenience of description, and does not limit the scope of the present invention.

Referring to FIG. 26(a), a V2X message 2602 includes location information 2604. In this case, the location information 2604 may mean GPS information.

Furthermore, the location information 2604 may include latitude information 2606, longitude information 2608, and elevation information 2610. A rectangle illustrated in FIG. 26 may mean a field including corresponding information.

In this case, in the V2X message 2602 transmitted by a UE, the latitude information 2606 may be converted into "k0 bit" and mapped, the longitude information 2608 may be converted into "m0 bit" and mapped, and the elevation information 2610 may be converted into "n0 bit" and mapped.

For example, if the latitude information 2606 and/or the longitude information 2608 are set to 4 bytes, a UE may perform full quantization using all of the 4 bytes.

If the latitude information 2606 consists of 4 bytes, the latitude where the UE is located may be expressed as 32 bits (01010110111010011010010011001101) as in FIG. 26(b).

Accordingly, the UE may express the latitude and/or the longitude using 4 bytes, that is, a level of $2^{32}$. That is, as in FIG. 27, the UE may determine the latitude and longitude in which the UE is located to be 4 bytes in a full quantized unit.

Figure 27:
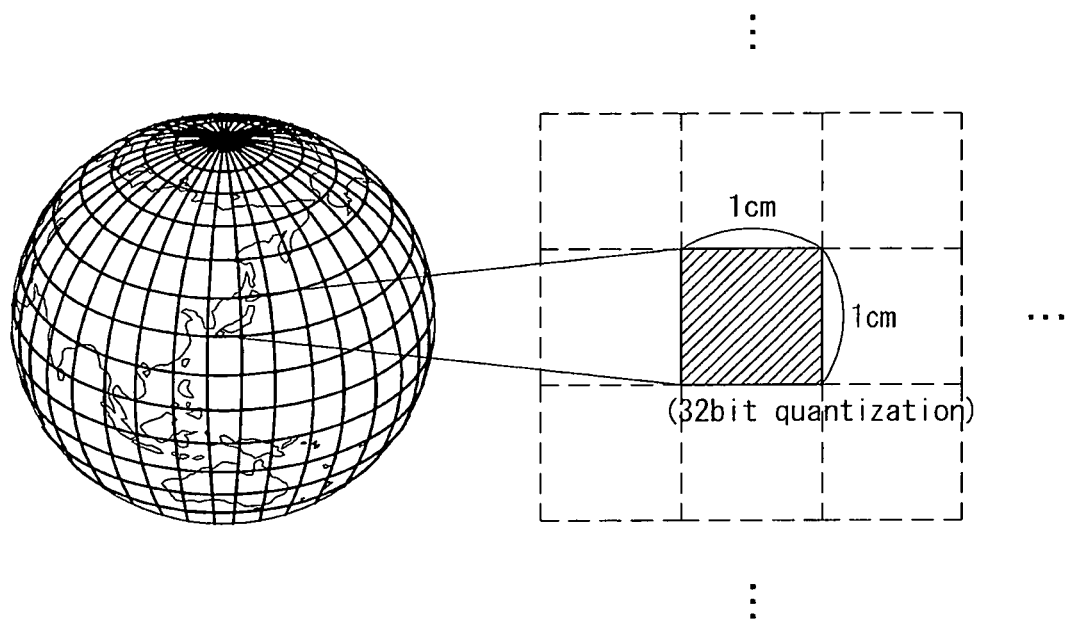
FIG. 27 illustrates a method of quantizing location information to which the present invention may be applied.

FIG. 27 illustrates a method of quantizing location information to which the present invention may be applied. FIG. 27 is only for convenience of description, and does not limit the scope of the present invention.

In this case, assuming that the circumference of the earth is about 40000 km, the full quantized unit may have a value of about 1 cm (40000 km/$2^{32}$).

In this case, the value has a meaning only when the accuracy of the location information (e.g., GPS information) is more accurate than 1 cm.

Furthermore, if the latitude is expressed up to 180 degrees not 360 degrees, accuracy is improved two times and thus the latitude may be expressed in a 0.5 cm unit.

In this case, the latitude information of the 1 cm unit may be accurate more than needs from a hardware viewpoint of a UE.

Accordingly, it is necessary to define a method of mapping location information to a V2X message by taking into consideration accuracy from a hardware viewpoint.

Figure 28:
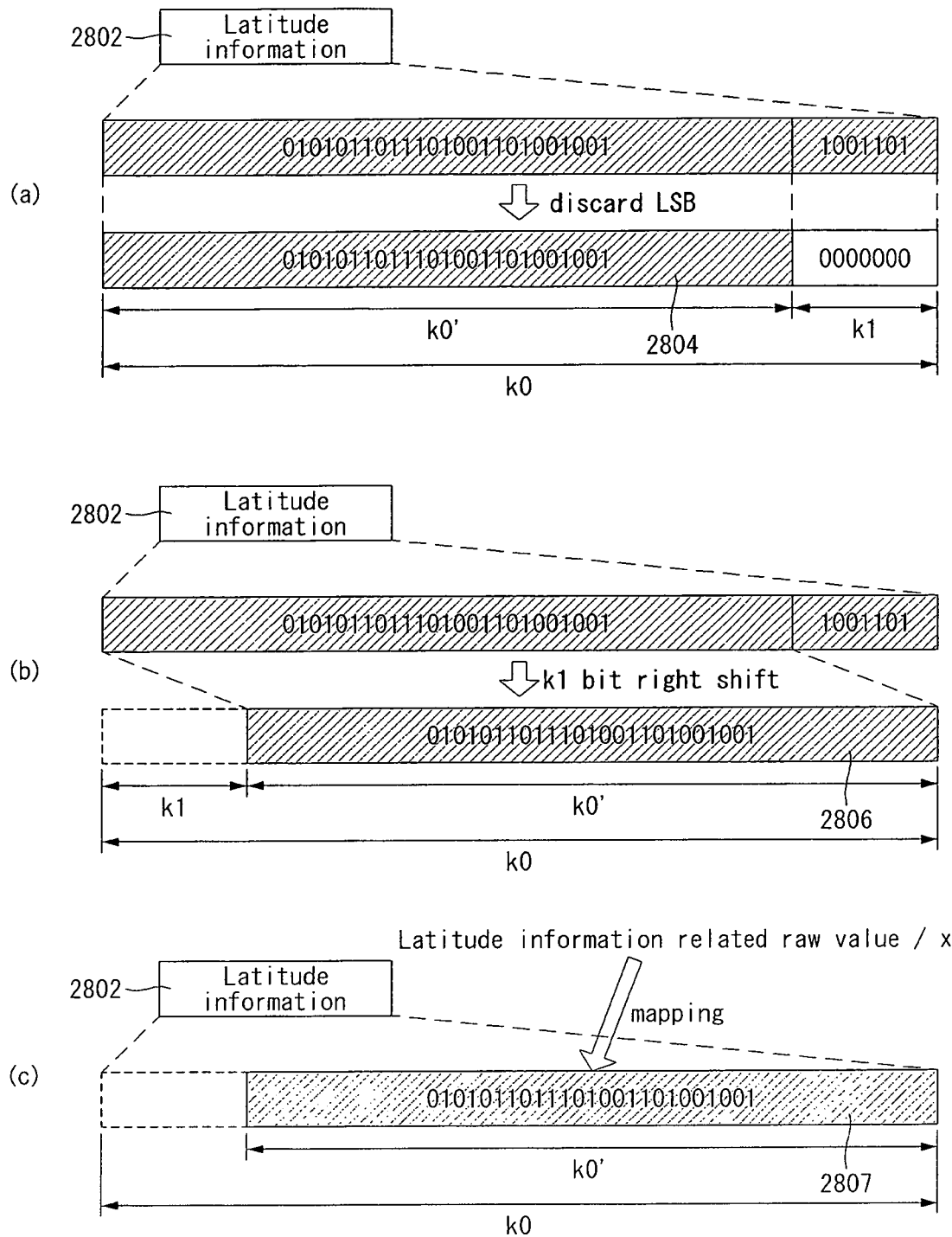
FIG. 28 illustrates methods of mapping location information of a UE to a message to which the present invention may be applied.

FIG. 28 illustrates methods of mapping location information of a UE to a message to which the present invention may be applied. FIG. 28 is only for convenience of description, and does not limit the scope of the present invention.

Referring to FIG. 28, if accuracy of a fully quantized case is expressed as "x0 (latitude)", "y0 (longitude)", and "z0 (elevation)", a case where the accuracy of actual location information is x (latitude), y (longitude), and z (elevation) cm, k1=ceil(log 2(x/x0)), m1=ceil(log 2(y/y0)), and n1=ceil (log 2(z/z0)) is assumed. In this case, ceil(X) means the value of the raising to a unit of an X value. Furthermore, latitude information 2802 may mean an information field indicating the latitude in which a UE is located.

For example, if location information is mapped to a message (V2X message), least significant bit (LSB) values corresponding to the k1, m1, and n1 may not be incorporated if location information of a UE is determined.

In this case, in order to subsequently map different information to a corresponding field, the LSB may be left as a spare. Alternatively, a different value other than the latitude/longitude/elevation values (or for supporting the latitude/longitude/elevation values) may be mapped to the LSB.

In order to actually calculate the latitude/longitude/elevation values of a UE, as in FIG. 28(a), LSB values corresponding to the k1, m1, and n1 may be filled with 0. That is, the latitude information of the UE may be expressed using only information 2804.

For another example, values corresponding to the latitude/longitude/elevation of the UE may be divided into 2k1/2m1/2n1 and may be mapped to fields indicating the latitude/longitude/elevation of the UE.

The sizes of the latitude/longitude/elevation fields may be reduced as much as k1/m1/n1 bits depending on an accuracy level.

That is, as in FIG. 28(b), the field (latitude information 2802) indicating the latitude information of the UE may be reduced into information 2806 as much as k1. In this case, there may be an effect in that the reduced field has been shifted to the left as much as k1.

In this case, in order to calculate the actual latitude/longitude/elevation values of the UE, the values calculated from the corresponding fields may be scaled as much as $2^{k1}/2^{m1}/2^{n1}$.

For another example, after values (raw values) corresponding to the latitude/longitude/elevation of a UE are divided by x/y/z, respectively, the latitude/longitude/elevation of the UE may be mapped to fields indicating the latitude/longitude/elevation of the UE. In this case, the x/y/z means values related to the accuracy of location information (e.g., GPS information). Accordingly, the field indicating the latitude information of the UE may be reduced like information 2807.

In this case, in order to calculate the actual latitude/longitude/elevation values of the UE, values calculated from the corresponding fields may be scaled as much as x/y/z.

In this case, in another example and yet another example described above, if the accuracy of the location information is adjusted less finely (compared to the full quantization method), location information having the same amount as that used in the example (or an example in which the LSB value is not incorporated) may not need to be used.

In other words, in order to express the latitude/longitude/elevation of the UE, only information of k0'/m0'/n0' bits may be mapped to the message as illustrated in FIG. 28. In this case, the k0' is smaller than or equal to k0, the m0' is smaller than or equal to m0, and the n0' is smaller than or equal to n0.

Common Information between UEs Supported by Specific Network Entity

In the case of UEs located in a specific region, the values of some upper bits in a field (e.g., 2802 of FIG. 28) related to location information may be identically mapped as constant values.

In other words, more accurately, in order to identify the locations of the UEs, the values of the remaining bits (or LSBs) other than the identically mapped some upper bits.

In this case, the some upper bits may mean common bits (or values) with respect to UEs present in a specific region.

In this case, the common bits may be determined depending on the range in which the UE is located.

For example, in the case of a UE present in the same country and/or the same region, the upper bits of location information corresponding to a specific country and/or a specific region based on a public land mobile network (PLMN) may be primarily the same (or common).

For example, the common bits may be the same as information 2904 of FIG. 29(a).

Figure 29:
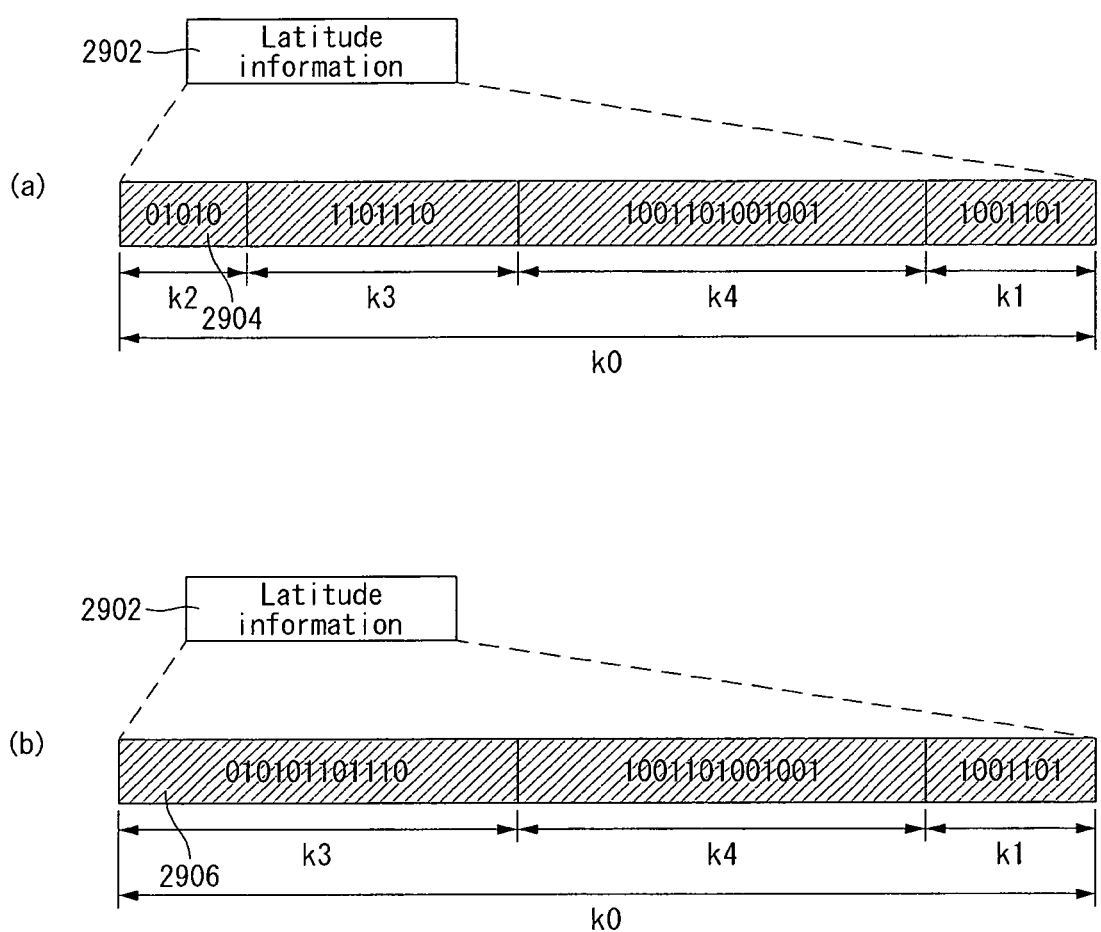
FIG. 29 illustrates examples of an overall configuration of latitude information of a UE to which the present invention may be applied.

FIG. 29 illustrates examples of an overall configuration of latitude information of a UE to which the present invention may be applied. FIG. 29 is only for convenience of description, and does not limit the scope of the present invention.

Latitude information 2902 illustrated in FIG. 29(a) may mean information indicating the location of a UE present in a specific country and/or a specific region.

In this case, information 2904 (or 01010) may be information (or common bits) indicating the specific country and/or the specific region.

More specifically, the location information of the specific country and/or specific region may be classified as in FIG. 30.

FIG. 30 illustrates a method of classifying location information with respect to a specific country and/or region to which the present invention may be applied. FIG. 30 is only for convenience of description, and does not limit the scope of the present invention.

FIG. 30(a) illustrates a method of classifying location information based on a specific latitude and longitude regardless of the boundary of a country.

In contrast, FIG. 30(b) illustrates a method of classifying location information in a grid form within a specific country.

In FIGS. 30(a) and 30(b), specific upper bits of bits indicating location information may be common between UEs included in the same region.

In this case, the common bits (or values) may be pre-defined within a corresponding country and/or region. Alternatively, a UE may obtain information about the common bits through higher layer signaling and/or physical layer signaling (e.g., a physical channel).

In this case, in the case of a UE that moves in various countries and/or regions, the method may not be efficient because the range of code to classify the countries and/or regions may be set to be very wide.

Accordingly, in the case of a UE that moves in the various countries and/or regions, a value of k2 illustrated in FIG. 29(a) may be set to 0. In other words, the values of k2/m2/n2 indicating the sizes of the fields for upper common bits of the latitude/longitude/elevation may be set to 0. In this case, if the value indicating the size of the field is set to 0, this may mean that the corresponding field is not present.

Furthermore, in various embodiments of the present invention, if the field, that is, k2/m2/n2, is filled with specific values or bits (e.g., 000 . . . 0 or 111 . . . 1), the corresponding field may be defined so that it is not used as code for identifying a country and/or region. In this case, the specific values or bits may be pre-defined between a specific network entity and UEs. Alternatively, a UE may obtain information about the specific values or bits through higher layer signaling and/or physical layer signaling (e.g., a physical channel).

Furthermore, in various embodiments of the present invention, a specific network entity present in a specific country and/or region may limit the location where a UE may be present to constant coverage based on its own (specific network entity) location.

In this case, the specific network entity may mean an entity capable of supporting V2X communication.

Accordingly, information (or resolution) corresponding to the coverage may be fixed to a common value with respect to the specific network entity. In other words, upper bits of location information of a UE supported by the specific network entity may be mutually common.

For example, if the accuracy of location information (or GPS) is 1 m and coverage of a radius 128 m is present around a specific network entity, the locations of UEs present within the coverage may be classified into pieces of information of lower 8 bits, and upper bits more than the lower 8 bits may be fixed as common values.

In this case, the coverage may not be accurately identical with quantized values of the location information, and thus a constant offset may be present.

In this case, in order to classify the locations of the UEs more accurately, a larger number of LSBs (e.g., lower 9 bit information) may be used.

The sizes of parts indicating the common values may be defined k3, m3, n3 other than upper bits corresponding to the specific country and/or region as in FIG. 29(b).

Furthermore, if division code for a specific country and/or region is not separately present, a part indicating the common value may be counted from the most significant bit.

A specific network entity may transmit upper bits (e.g., k3/m3/n3 bit) indicating (or indicating) its own location (e.g., of an eNB or RSU) and V2X coverage formed from the corresponding location.

In this case, location information corresponding to the specific country and/or region may be excluded from the transmitted message.

In this case, the transmitted message may mean a V2X message in which location information has been compressed.

Method of Generating Message by Taking into Consideration Common Information between UEs A method for a specific network entity to receive V2X messages from UEs and then to transmit a V2X message including the contents of the corresponding messages to (different) UEs is illustrated in FIGS. 31a to 31d.

FIGS. 31a to 31d illustrate examples of a message transmission method based on a specific network entity to which the present invention may be applied. FIGS. 31a to 31d are only for convenience of description, and do not limit the scope of the present invention.

Figure 31A:
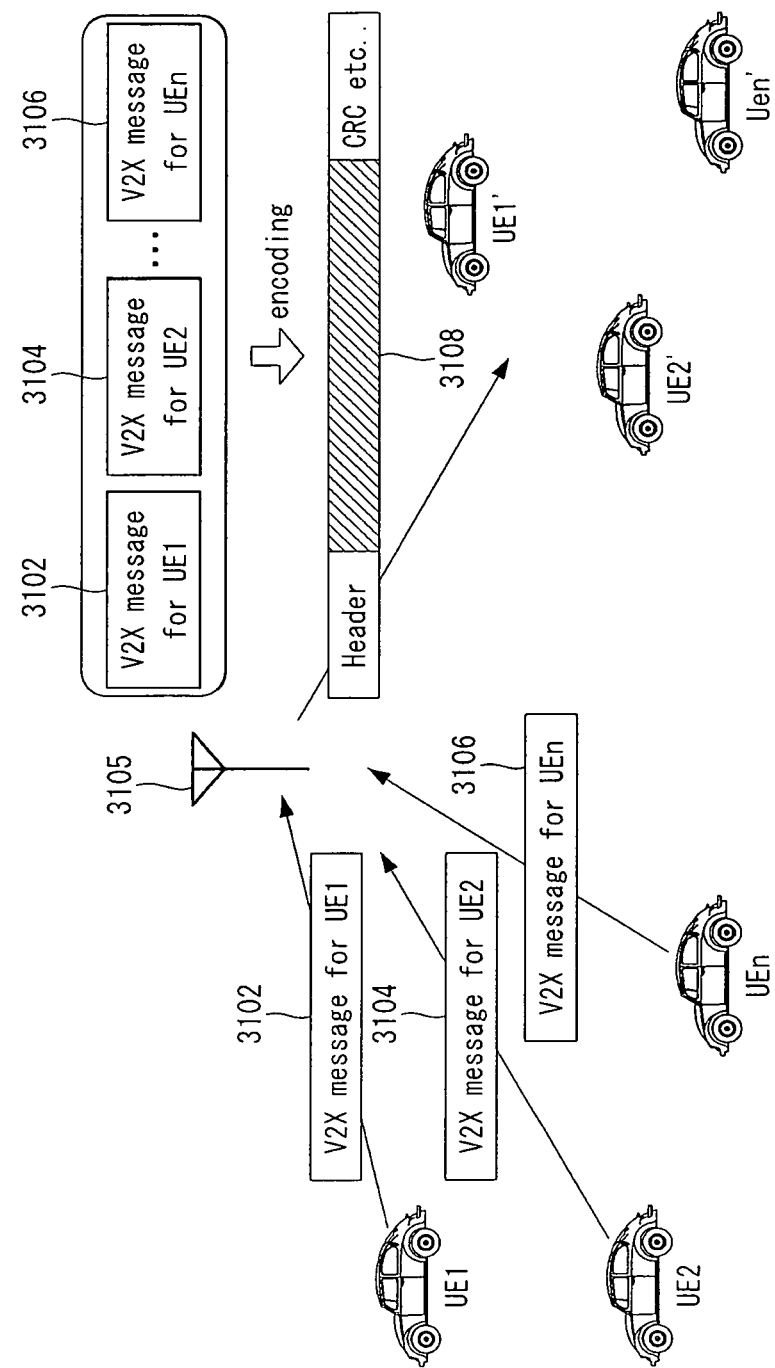
FIGS. 31a to 31d illustrate examples of a message transmission method based on a specific network entity to which the present invention may be applied.

FIG. 31a illustrates a method for a specific network entity to deliver a message to UEs without performing message compression on messages received from UEs.

For example, the network entity 3105 may receive n V2X messages from n UEs. In this case, the n V2X messages may be expressed as a message 3102, a message 3104 to a message 3106.

After the network entity 3105 receives the messages, it may encode the received message 3102, message 3104 to message 3106. Accordingly, all the messages received from the UEs may be encoded into single payload (or data) 3108.

That is, the network entity 3105 may pack and encode messages received from UEs without any change, and may transmit it to UEs.

In this case, unnecessary overhead may occur because redundant common information (i.e., the aforementioned common part of location information of UEs present in a specific region) may be transmitted to the UEs.

In contrast, if a common bit part (e.g., the aforementioned upper bits of location information of UEs present in a specific region) is included in messages received from UEs, the specific network entity may compress the common bit part with respect to the received messages and transmit it or may transmit the common bit part using different signaling (e.g., higher layer signaling).

Figure 31B:
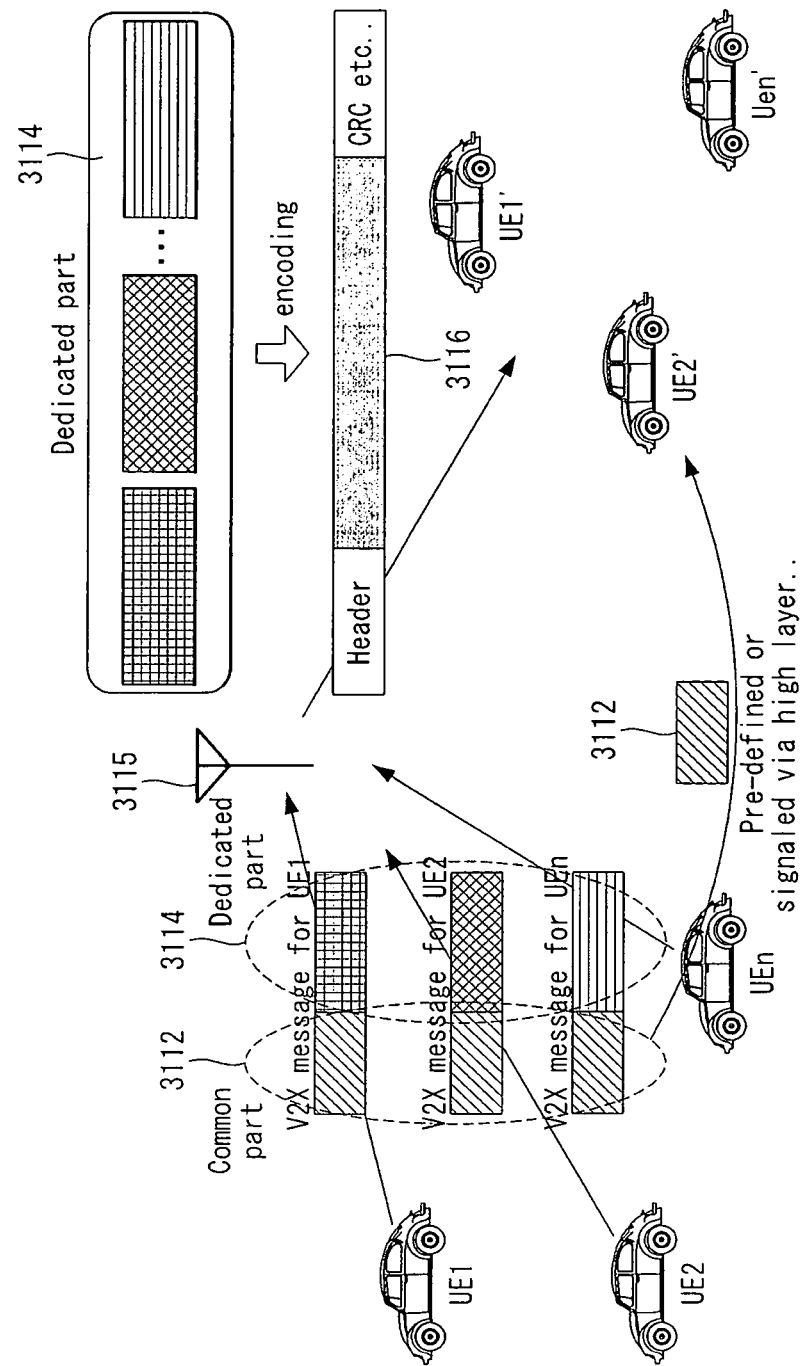

FIG. 31b illustrates a method for a specific network entity to transmit a message, not including a common bit part, to UEs according to an embodiment of the present invention. FIG. 31b is only for convenience of description, and does not limit the scope of the present invention.

Referring to FIG. 31b, a case where each of V2X messages received by a network entity 3115 includes a common part 3112 and a dedicated part 3114 is assumed.

In this case, the common part 3112 may mean common information (e.g., an upper bit part of location information) between UEs that transmit the messages to the network entity 3115.

In this case, the common part 3112 may be pre-defined between UEs present within coverage of a specific network entity. Alternatively, a specific network entity may transmit information about the common part 3112 to UEs through higher layer signaling (e.g., RRC signaling) and/or a physical channel (e.g., a physical channel of a Uu/PC5 I2V interface). Alternatively, the UE may directly transmit the common part 3112 to a different UE using vehicle-to-vehicle (V2V) communication.

In contrast, the dedicated part 3114 may mean information (e.g., UE-specific information) differently configured in each of UEs that messages to the network entity 3115.

In this case, the dedicated part 3114 may mean the contents of a V2X message including the LSBs (e.g., k4 bits illustrated in FIG. 29(b)) of (GPS) location information capable of indicating the location of a UE more accurately.

In this case, the network entity 3115 may configure payload 3116 by performing encoding on the dedicated part 3114, and may transmit a message including the payload 3116 to UEs.

In other words, the network entity 3115 may transmit a V2X message, not including information about the common part 3112, to the UEs. Accordingly, the common part that is unnecessary can be prevented from being redundantly transmitted.

Figure 31C:
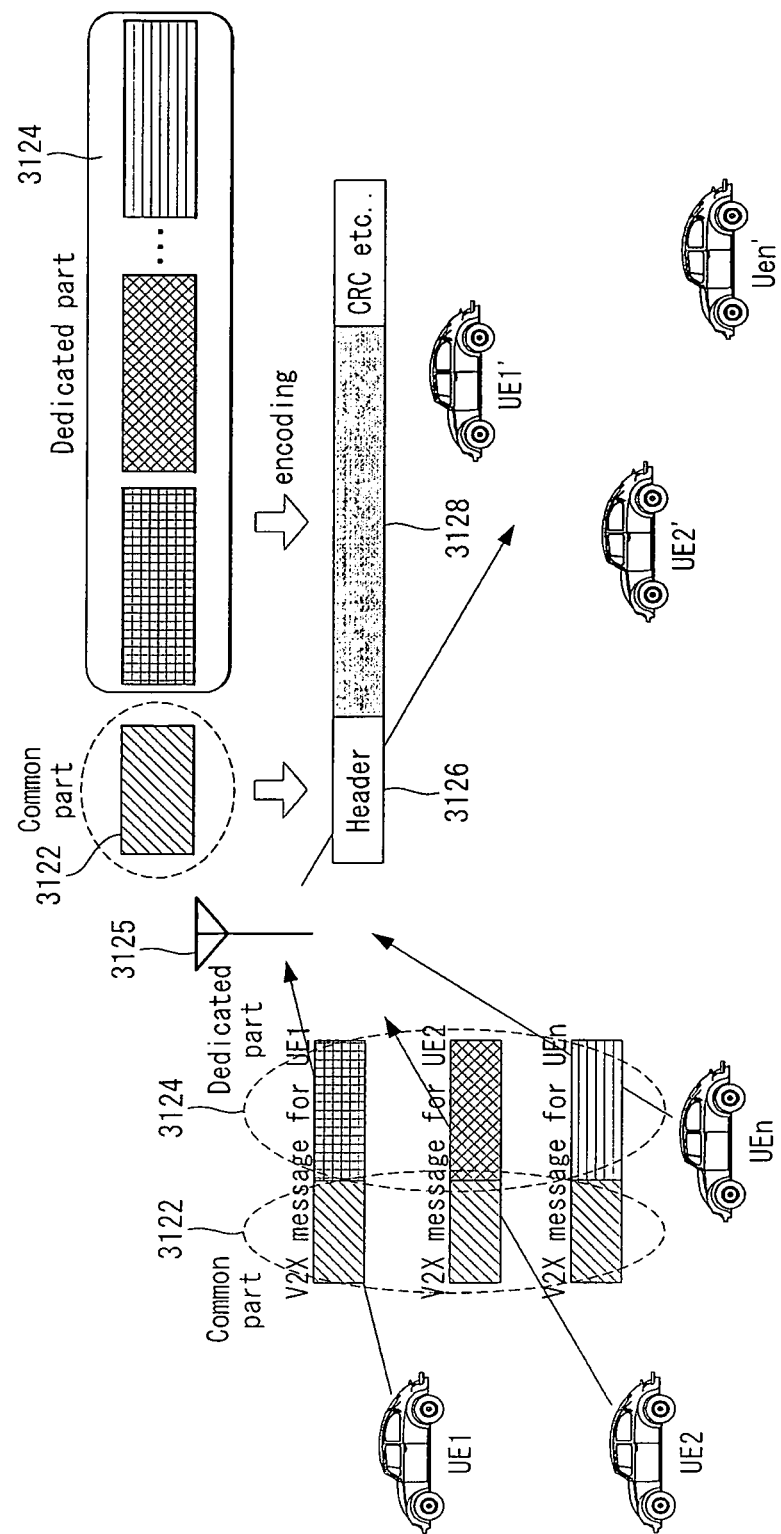

Furthermore, FIG. 31c illustrates an example of a method for a specific network entity to transmit a message compressed in relation to a common bit part to UEs another embodiment of the present invention. FIG. 31c is only for convenience of description, and does not limit the scope of the present invention.

Referring to FIG. 31c, a case where each of V2X messages received by a network entity 3125 from UEs includes a common part 3122 (e.g., information 2906 illustrated in FIG. 29(b)) and a dedicated part 3124 is assumed.

In this case, the common part 3122 may correspond to the common part 3112 of FIG. 31b, and the dedicated part 3124 may correspond to the dedicated part 3114 of FIG. 31b.

In this case, the network entity 3125 may generate a message to be transmitted to (different) UEs based on the common parts 3122 and the dedicated parts 3124 received from the UEs. In this case, the message may include a header 3126 and payload 3128.

In this case, the network entity 3125 may encode information about the received dedicated parts 3124 into the payload 3128.

In this case, unlike in FIGS. 31a and 31b, the network entity 3125 may encode (or map) common information of the received common parts 3122 into part of the header 3126.

In other words, the network entity 3125 may configure all of a plurality of pieces of common (or the same) information, received from a plurality of UEs, into only one piece of common information as part of the header.

That is, an information element indicating common information may be included in a specific field included in the header of a message transmitted to UEs.

Accordingly, common parts (e.g., common parts 3122) can be prevented from being redundantly included in a message transmitted from the network entity 3125 to UEs.

Figure 31D:
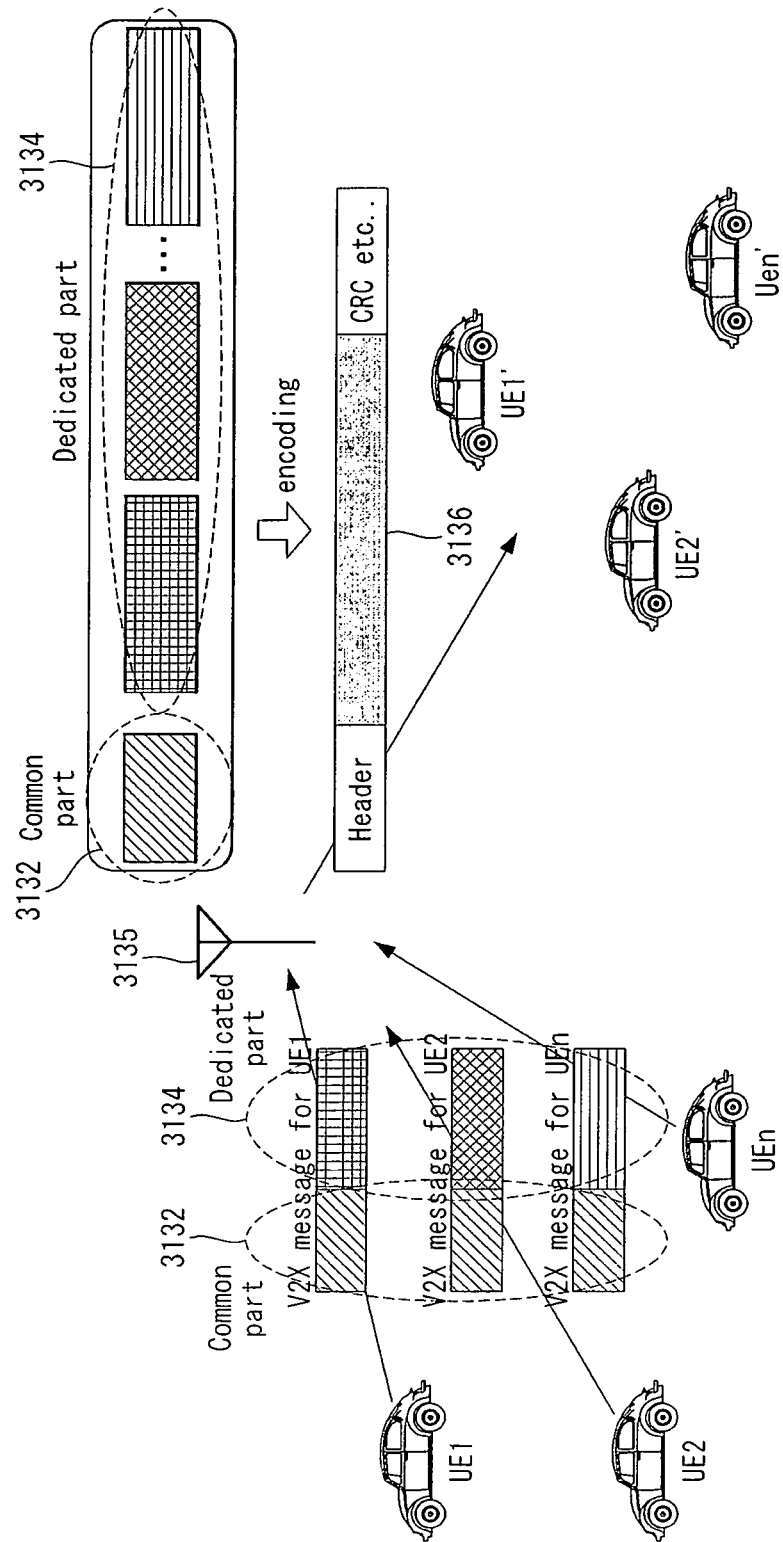

Furthermore, FIG. 31*d* illustrates an example of a method for a specific network entity to transmit a message compressed in relation to a common bit part to UEs according to yet another embodiment of the present invention. FIG. 31*d* is only for convenience of description, and does not limit the scope of the present invention.

Referring to FIG. 31*d*, a case where each of V2X messages received by a network entity 3135 from UEs includes a common part 3132 and a dedicated part 3134 is assumed.

In this case, the common part 3132 may correspond to the common part 3112 of FIG. 31*b*, and the dedicated part 3134 may correspond to the dedicated part 3114 of FIG. 31*b*.

In the case of FIG. 31*d*, unlike in FIG. 31*c*, the common part 3132 is not configured as part of the header of a message transmitted from the network entity 3132 to UEs.

In this case, the common part 3132, together with the dedicated part 3134, may be formed into payload 3136.

In this case, unlike in FIG. 31*a*, the common part 3132 forming the payload 3136 means information commonly applied to UEs (e.g., upper bits if location information of a UE present in a specific region or common location information).

In this case, the commonly applied information is included in the payload 3136 only one so that common information received from UEs is not redundant.

In the methods, by way of example, part of location information (e.g., GPS information) has been only once allocated to a message transmitted from a network entity to UEs as information common between the UEs.

However, if any information and/or messages are common between UEs within coverage supported by a specific network entity in addition to location information, the specific network entity may operate according to a method similar to the aforementioned methods.

In other words, a specific network entity (e.g., eNB or RSU) may generate a message (e.g., V2X message, BSM) to be transmitted to UEs by allocating (or mapping) the common information and/or messages to part of a header and/or payload only once.

That is, a specific network entity may perform message compression, a compact message generation or a message suppression operation on a common part between UEs supported by the specific network entity.

In various embodiments of the present invention, even in the case of FIG. 31*c* and/or FIG. 31*d*, as in the method described in FIG. 31*b*, a common part may be pre-defined in UEs (UEs supported by a specific network entity) and a network entity. Alternatively, the network entity may deliver information about the common part to the UEs through signaling (e.g., higher layer signaling or physical layer signaling).

Unnecessary overhead occurring as a network entity transmits redundant information to UEs can be prevented based on the aforementioned method.

Unlike in the case of the aforementioned methods, in various embodiments of the present invention, although UEs not using a specific network entity directly perform communication, each UE may not transmit a common information part to different UEs or may not receive it from different UEs.

In this case, the common part may mean upper bits of location information expressed as the same contents because UEs are present within a specific region, such as that described above.

In this case, if the UEs operate in the RRC connected state, each UE may transmit ID information, such as the ID of a cell to which the UE is connected, to a different UE instead of the common part.

In this case, the ID information may be included in a specific field of a V2V message and transmitted, but may be delivered using an implicit method such as a resource allocation structure.

Accordingly, another UE can recognize that a wireless communication service is supported for a UE that has transmitted a V2V message through the same network entity (e.g., eNB, the RSU) as another UE.

Alternatively, a UE may report information (e.g., geo-location information) about a region to which the UE moves to another UE instead of the ID information.

For example, if location information is divided according to a 2D grid method of a specific unit, each UE may report its own location to a different UE using corresponding coordinates.

In this case, information indicating the location of the UE may be expressed as an information element of a specific field of a V2V message.

The method using information about a region may be applied to all cases where UEs operates in the RRC connected state or idle state.

Figure 32:
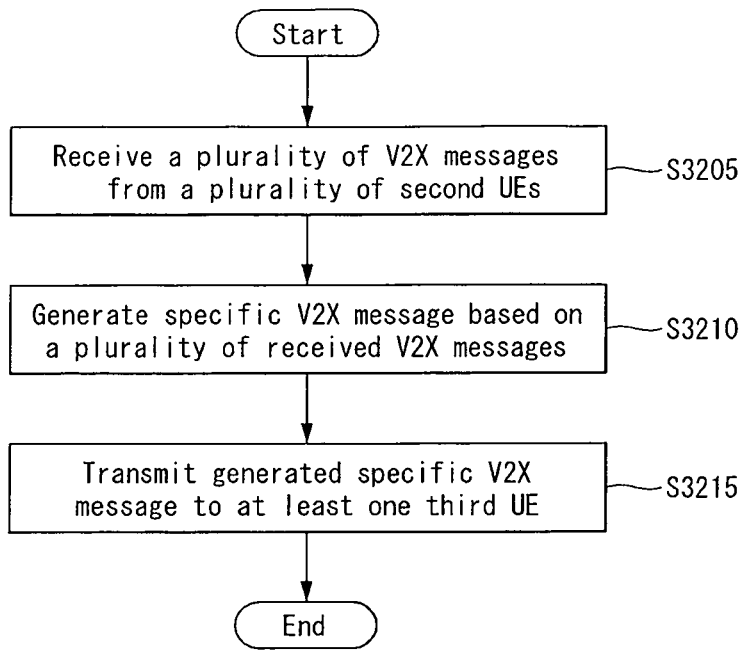
FIG. 32 illustrates an operation method of a first UE transmitting a V2X message according to various embodiments of the present invention.

FIG. 32 illustrates an operation method of a first UE transmitting a V2X message according to various embodiments of the present invention. FIG. 32 is only for convenience of description, and does not limit the scope of the present invention.

In the case of FIG. 32, the first UE may mean the aforementioned network entity, that is, an eNB or the RSU of an eNB type. Furthermore, a second UE and a third UE mean UEs supporting V2X communication. The second UE and the third UE mean UEs for which services are supported from the first UE.

In relation to the aforementioned contents, the first UE may mean a specific network entity, and the second UE and the third UE may receive support for services by the specific network entity.

Furthermore, the V2X message may mean a message (e.g., BSM) related to the safety of the first UE, the second UE and/or the third UE.

In step S3205, the first UE receives a plurality of V2X messages from a plurality of second UEs. In this case, the first UE may receive the plurality of V2X messages using a Uu interface or PC5 interface.

Each of the plurality of V2X messages may include a common information element related to the plurality of second UEs and a UE-specific dedicated information element. In this case, the common information element may mean the common part illustrated in FIGS. 31*b* to 31*d*, and the dedicated information element may mean the dedicated part illustrated in FIGS. 31*b* to 31*d*.

The common information element may include a specific one of information elements indicating the locations of the plurality of second UEs. In this case, the specific information element may include at least one specific upper bit of a plurality of bits indicating the locations of the plurality of second UEs. That is, the common information element may mean a value identically configured with respect to the plurality of second UEs. For example, the at least one specific upper bit may be the "k2" bit (information 2904) illustrated in FIG. 29(*a*) or the "k3" bit (information 2906) illustrated in FIG. 29(*b*). More specifically, the at least one specific upper bit may be at least one bit (e.g., a bit determined based on a PLMN) indicating a specific country and/or specific region where the first UE (i.e., a specific network entity supporting UEs) is located.

The dedicated information element may include the identifier (ID) of each UE, the ID of a V2X message and/or the ID of a network entity supporting the UE.

After the first UE receives the plurality of V2X messages, the first UE generates a specific V2X message based on the plurality of received V2X messages in step S3210.

The specific V2X message may include a plurality of dedicated information elements, received from a plurality of UEs and corresponding to the plurality of second UEs, and a common information element. In other words, the specific V2X message includes all of dedicated information elements for the plurality of second UEs, but includes only one common information element in order to prevent redundancy in the case of a common information element. That is, the common information element included in the specific V2X message may mean a common information element received from any one of the plurality of second UEs.

Furthermore, the common information element may be included in a specific field of the header of the specific V2X message (e.g., FIG. 31c). Alternatively, the common information element may be encoded along with the plurality of dedicated information elements and included in the V2X message (e.g., FIG. 31d).

After the first UE generates the specific V2X message, the first UE may transmit the generated specific V2X message to at least one third UE in step S3215. In this case, the transmission may mean transmission of a broadcast method or transmission of a multicast method. The first UE may use a Uu interface or PC5 interface when it transmits the specific V2X message.

As described above, the occurrence of unnecessary overhead is prevented because the first UE does not redundantly transmit a received common information element to at least one third UE.

General Apparatus to which the Present Invention may be Applied

Figure 33:
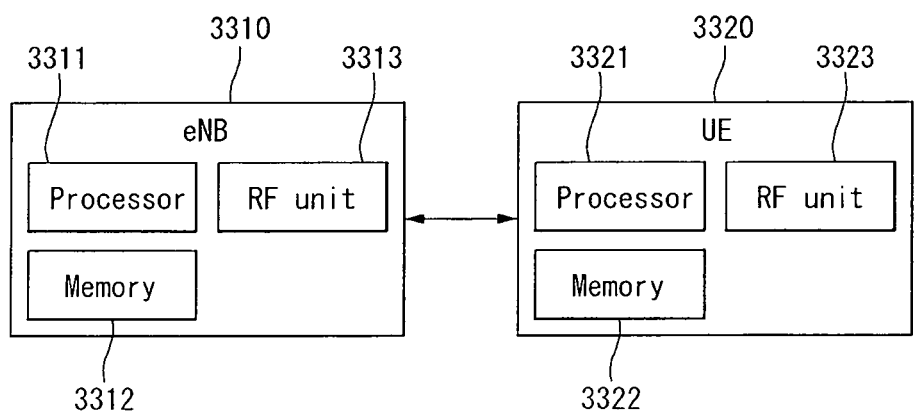
FIG. 33 illustrates a block diagram of a wireless communication device according to an embodiment of the present invention.

FIG. 33 illustrates a block diagram of a wireless communication apparatus according to an embodiment of the present invention.

Referring to FIG. 33, a wireless communication system includes a network node 3310 and multiple UEs 3320.

The network node 3310 includes a processor 3311, a memory 3312 and a communication module 3313. The processor 3311 implements the functions, processes and/or methods proposed in FIGS. 1 to 32. The layers of a wired/wireless interface protocol may be implemented by the processor 3311. The memory 3312 is connected to the processor 3311 and stores various pieces of information for driving the processor 3311. The communication module 3313 is connected to the processor 3311 and transmits and/or receives wired/wireless signals. In particular, if the network node 3310 is an eNB, the communication module 3313 may include a radio frequency (RF) unit for transmitting/receiving radio signals.

The UE 3320 includes a processor 3321, a memory 3322 and a communication module (or RF unit) 3323. The processor 3321 implements the functions, processes and/or methods proposed in FIGS. 1 to 32. The layers of a radio interface protocol may be implemented by the processor 3321. The memory 3322 is connected to the processor 3321 and stores various pieces of information for driving the processor 3321. The communication module 3323 is connected to the processor 3321 and transmits and/or receives radio signals.

The memory 3312, 3322 may be located inside or outside the processor 3311, 3321 and may be connected to the processor 3311, 3321 by various well-known means. Furthermore, the network node 3310 (if it is an eNB) and/or the UE 3320 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

An example in which the method of transmitting a V2X message in a wireless communication system of the present invention has been illustrated as being applied to the 3GPP LTE/LTE-A system, but the method may be applied to various wireless communication systems in addition to the 3GPP LTE/LTE-A system.

The invention claimed is:

1. A method of transmitting a V2X message in a wireless communication system supporting vehicle-to-everything (V2X) communication, the method performed by a first user equipment (UE) comprising:

receiving, from a plurality of second UEs, a plurality of V2X messages, generating a specific V2X message based on the plurality of received V2X messages, and transmitting, to at least one third UE, the generated specific V2X message, wherein each of the plurality of received V2X messages comprises a common information element related to the plurality of second UEs, and a dedicated information element configured for each UE, and wherein the specific V2X message comprises a plurality of dedicated information elements corresponding to the plurality of second UEs, which are received from the plurality of second UEs, and the common information element.

2. The method of claim 1, wherein the common information element included in the specific V2X message comprises a common information element received from any one of the plurality of second UEs.

3. The method of claim 2, wherein the common information element related to the plurality of second UEs comprises a value identically configured with respect to the plurality of second UEs.

4. The method of claim 3, wherein the common information element is included in a specific field of a header of the specific V2X message.

5. The method of claim 3, wherein the common information element is included in the specific V2X message by encoding along with the plurality of dedicated information elements.

6. The method of claim 3, wherein the specific V2X message is transmitted to the at least one third UE, using a Uu interface or a PC5 interface.

7. The method of claim 3, wherein the common information element comprises a specific information element of information elements indicating locations of the plurality of second UEs.

8. The method of claim 7, wherein the specific information element comprises at least one specific upper bit of a plurality of bits indicating the locations of the plurality of second UEs.

9. The method of claim 8, wherein the at least one specific upper bit comprises at least one bit indicating at least one of a specific country and specific region in which the first UE is located.

10. The method of claim 9, wherein the at least one bit is determined based on a public land mobile network (PLMN).

11. The method of claim 1, wherein the dedicated information element comprises at least one of an identifier (ID) of a UE, an ID of a V2X message or an ID of a network entity supporting the UE.

12. A first user equipment transmitting a V2X message in a wireless communication system supporting vehicle-to-everything (V2X) communication, the first user equipment (UE) comprising:

a transceiver for transmitting and receiving radio signals,
a processor functionally connected to the transceiver,
wherein the processor controls to:
receive, from a plurality of second UEs, a plurality of V2X messages;
generate a specific V2X message based on the plurality of received V2X messages; and
transmit, to at least one third UE, the generated specific V2X message,
wherein each of the plurality of received V2X messages comprises a common information element related to the plurality of second UEs, and a dedicated information element configured for each UE, and
wherein the specific V2X message comprises a plurality of dedicated information elements corresponding to the plurality of second UEs, which are received from the plurality of second UEs, and the common information element.

* * * * *